US008718460B2

(12) United States Patent
Itoh

(10) Patent No.: US 8,718,460 B2
(45) Date of Patent: May 6, 2014

(54) RANGE FINDING DEVICE, RANGE FINDING METHOD, IMAGE CAPTURING DEVICE, AND IMAGE CAPTURING METHOD

(75) Inventor: Kei Itoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 76 days.

(21) Appl. No.: 13/344,221

(22) Filed: Jan. 5, 2012

(65) Prior Publication Data

US 2012/0195580 A1    Aug. 2, 2012

(30) Foreign Application Priority Data

Jan. 5, 2011    (JP) ................................ 2011-000538

(51) Int. Cl.
*G03B 3/10*    (2006.01)
(52) U.S. Cl.
USPC ......................................... 396/123; 348/345
(58) Field of Classification Search
USPC .................. 396/121–123, 111, 113; 348/345, 348/348–349, 350
See application file for complete search history.

(56) References Cited

U.S. PATENT DOCUMENTS

| 5,913,082 | A  | * | 6/1999 | Onoda ........................... 396/128 |
| 6,542,696 | B2 | * | 4/2003 | Kindaichi et al. ............ 396/123 |
| 7,071,985 | B1 | * | 7/2006 | Onoda et al. .................. 348/349 |
| 8,018,524 | B2 | * | 9/2011 | Kawarada ...................... 348/350 |
| 8,391,699 | B2 | * | 3/2013 | Uehara .......................... 396/123 |
| 8,452,168 | B2 | * | 5/2013 | Itoh ............................... 396/111 |
| 2002/0150308 | A1 | * | 10/2002 | Nakamura ..................... 382/286 |
| 2003/0123872 | A1 | * | 7/2003 | Yoshida et al. ............... 396/123 |
| 2012/0033957 | A1 | | 2/2012 | Itoh |
| 2012/0300019 | A1 | * | 11/2012 | Yang et al. ...................... 348/36 |

FOREIGN PATENT DOCUMENTS

| JP | 4217491 | 11/2008 |
| JP | 4794162 | 8/2011 |

\* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

A range-finding device includes: a plurality of image capturing elements that are provided at a predetermined interval; a lens that forms an image of a range-finding object on each of the image capturing elements; a distance calculating unit that calculates a distance to the range-finding object for each of a plurality of range-finding areas that are set on the respective image capturing elements based on an image signal output from each of the range-finding areas according to the image that is formed; a distribution generating unit that generates a distribution of the calculated distances; and a position specifying unit that specifies a position where the range-finding object is present in the range-finding area based on the distribution of the distances.

6 Claims, 33 Drawing Sheets

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

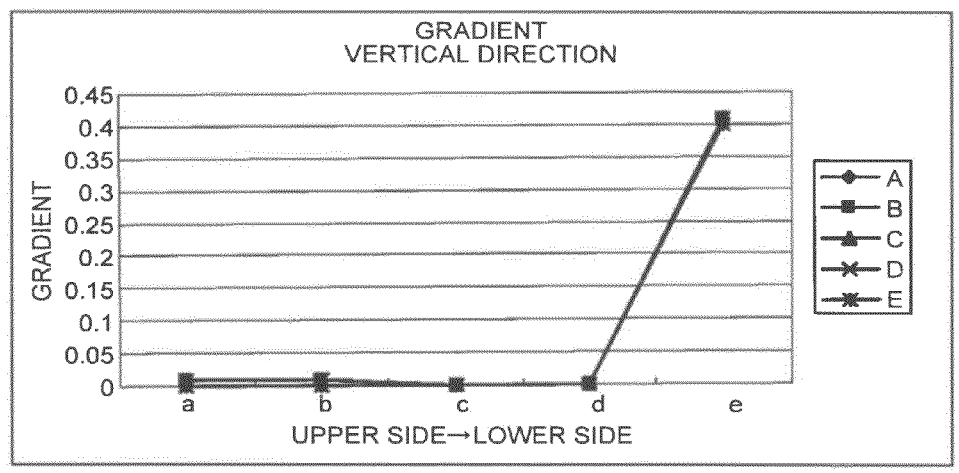
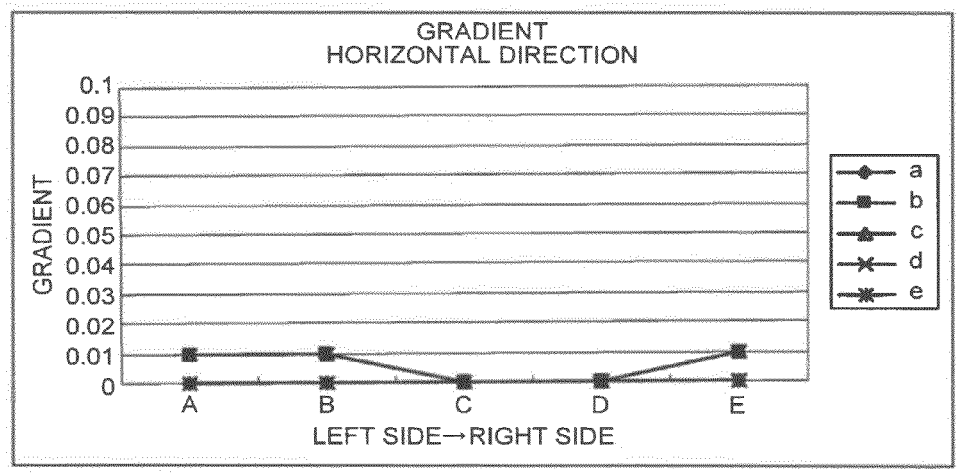

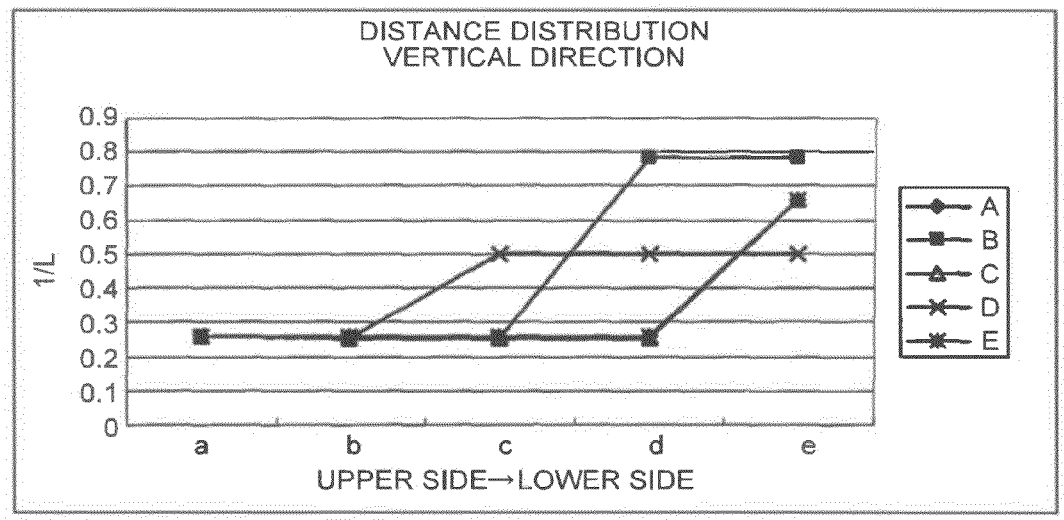
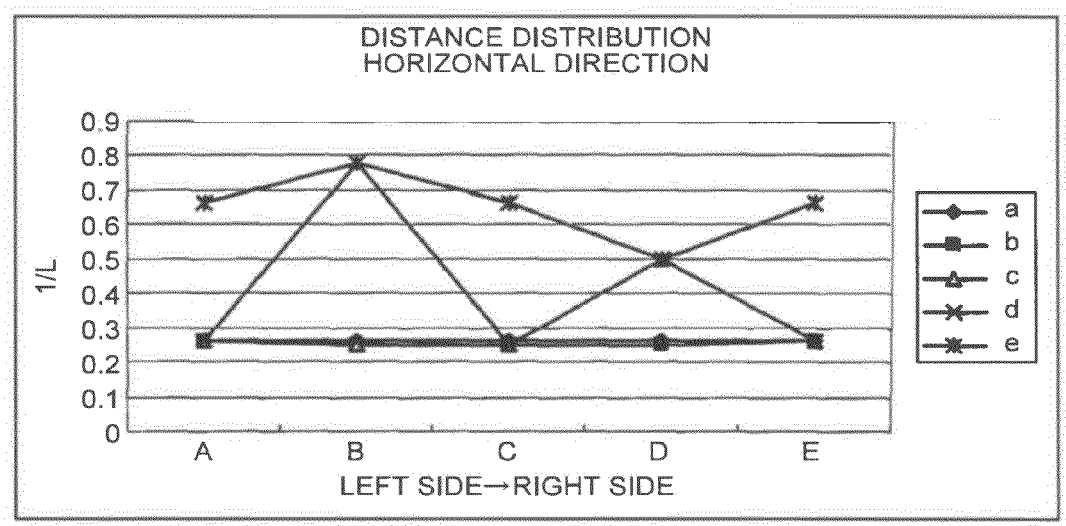

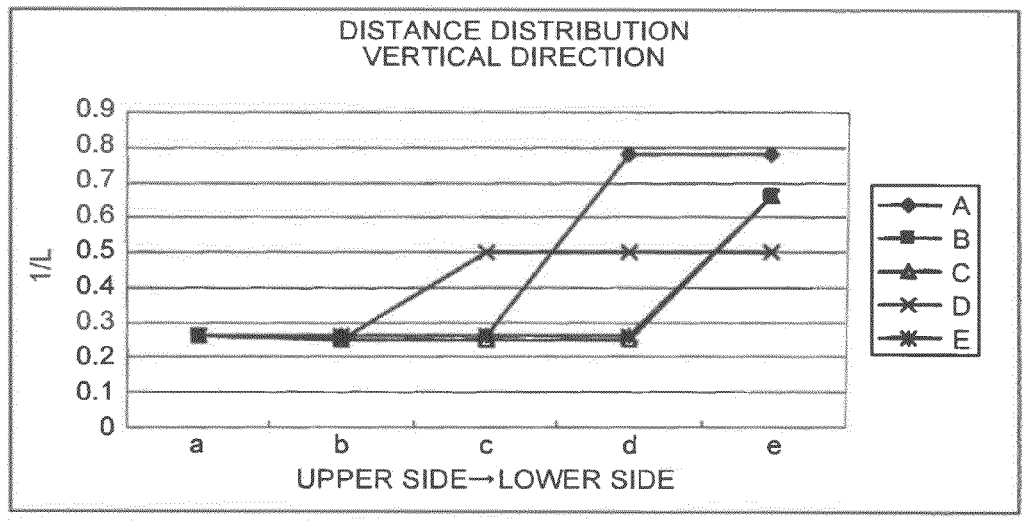
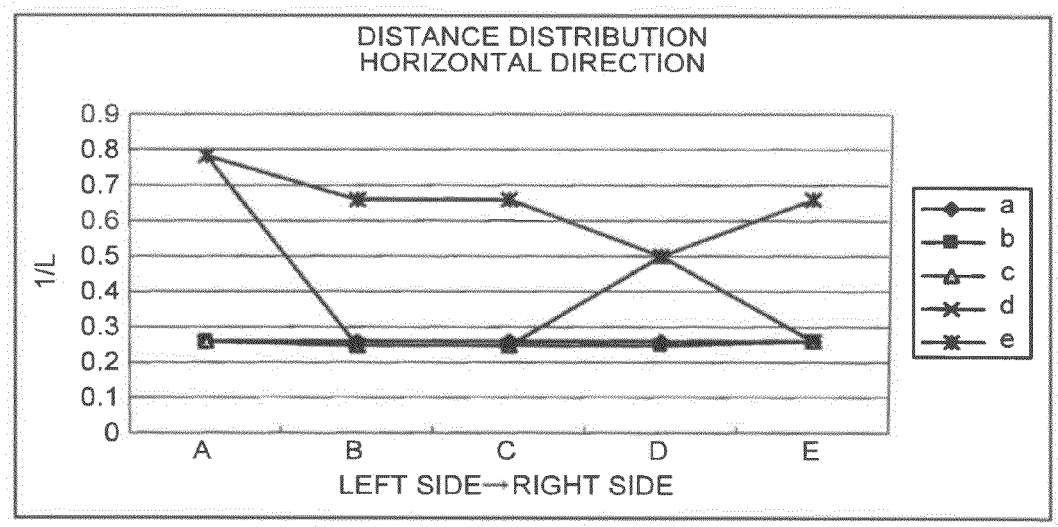

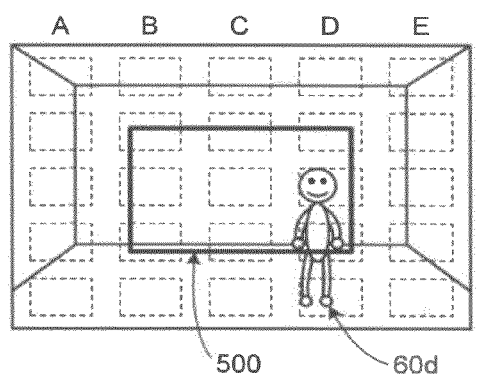
FIG. 39A  FIG. 39B
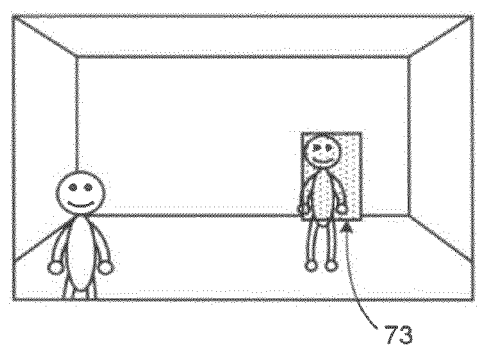
FIG. 40A  FIG. 40B
FIG. 41

RANGE FINDING DEVICE, RANGE FINDING METHOD, IMAGE CAPTURING DEVICE, AND IMAGE CAPTURING METHOD

CROSS-REFERENCE TO RELATED APPLICATION

The present application claims priority to and incorporates by reference the entire contents of Japanese Patent Application No. 2011-000538 filed in Japan on Jan. 5, 2011.

BACKGROUND OF THE INVENTION

1. Field of the Invention

The present invention relates to a range finding device that measure a distance to a target serving as an object in a camera, a video camera, or the like; a range finding method; an image capturing device that includes the range finding device; and an image capturing method.

2. Description of the Related Art

An external range finding device using a pair of line sensors has been known. The range finding device includes a pair of line sensors and a pair of lenses that are arranged to face each other, acquires two images (the images of a range-finding object) using the two line sensors, calculates the deviation (parallax) between the images, and calculates the distance using the triangulation principle.

As the range finding device according to the related art, a range finding device has been proposed to include a pair of line sensors and a photometric sensor that is larger in size than the line sensors are arranged on a semiconductor chip such that the center lines of the sensors are shifted from each other so as to reduce the size of the semiconductor chip and to reduce the size of the whole range finding device (for example, see Japanese Patent No. 4217491).

In addition, another range finding device that includes two light receiving elements has been proposed. In the device, in order to acquire an image of an object serving as a range-finding object (hereinafter, referred to as an "object"), a light receiving area of each of the light receiving elements is divided into a plurality of range-finding areas, a range finding calculation is performed using the parallax between the range-finding areas, the range finding process is performed again when an amount of charge stored is insufficient, and a strobe light or auxiliary light is emitted while charge is being stored for enabling the range finding even in a dark environment (for example, see Japanese Patent Application Laid-open No. 2005-227750).

Because the range finding devices disclosed in Japanese Patent No. 4217491 and Japanese Patent Application Laid-open No. 2005-227750 use the line sensors, a distance can be measured only at the center of the field of view, and it is difficult for the range finding devices to measure the distance over the entire screen (multi-point range finding is impracticable). A two-dimensional sensor may be used instead of the line sensors so as to measure the distance in a wide range (multi-point range finding). However, when the two-dimensional sensor is used, the range in which the distance can be measured becomes wide and it is required to detect an accurate position where the object is present in the image received by the two-dimensional sensor. Specifically, when the "near side priority mode" is set, the distance to a close object is measured. When the object is in the distance, an error occurs in the measurement of the distance. This problem is caused by an increase in the number of the measurement results that are produced when the two-dimensional sensor is used to measure the distance.

The problem with a case where the two-dimensional sensor is used to measure the distance will be described below with reference to the drawings. FIGS. 46A and 46B are diagrams illustrating an example of the image received by the image capturing area when the range-finding object is outdoors. An image capturing area 40 and a range-finding object 600 are illustrated in FIGS. 46A and 46B. In FIG. 46A, the object 600 is substantially at the center of the image capturing area 40. As illustrated in FIG. 46B, the image capturing area 40 is divided into columns and rows of range-finding areas with a predetermined size. For description, the image capturing area 40 are assigned reference numerals A, B, and C for the columns and a, b, and c for the rows. When distance data is calculated for each of the divided range-finding areas in the columns and rows, the value of the distance data varies depending on the position of the range-finding areas in the image capturing area 40. FIGS. 47A and 47B are graphs illustrating an example of a distance distribution data. FIG. 47A illustrates an example of the distance distribution data for the columns, in which the vertical axis indicates the reciprocal of the distance and the horizontal axis indicates the position of range-finding area in the vertical direction. FIG. 47B illustrates an example of the distance distribution data for the rows, in which the vertical axis indicates the reciprocal of the distance and the horizontal axis indicates the position of range-finding area in the horizontal direction.

In FIGS. 47A and 47B, the vertical axis indicates the reciprocal of the distance so as to allow the distance to be plotted in the graph even when the distance becomes infinitely large. In addition, as illustrated in FIG. 47A, the distance data of all the columns is reduced from the upper side to the lower side and the graph shows an increasing tendency. That is, the value of the distance data of the upper range-finding area in the image capturing area 40 is large and the value of the distance data of the lower range-finding area in the image capturing area 40 is small. In the vicinity of the center of the line B, the value of the distance data is reduced and the increasing rate of the graph is more than those of other positions. In FIG. 47A, the object 600 is present in a portion enclosed by a dotted circle 600a.

As illustrated in FIG. 47B, the distance data of all the rows is a constant value. Because the line a is empty, the value of the distance data of the row a indicates infinity. Therefore, the reciprocal of the value is zero. Because the line c is the ground, it is closest in the image capturing area 40. Therefore, the reciprocal of the distance data is large. Because the object 600 is present in the vicinity of the center of the line b, the value of the vicinity of the center of the horizontal axis is slightly large. The object 600 is present in the portion enclosed by the dotted circle 600a.

As illustrated in FIG. 47B, because the distance data of the vicinity of the center of the line B on which the object 600 is present has substantially the same value, the range finding device set to the "short-distance priority mode" determines that the object 600 is present at the position with the minimum distance data (the largest reciprocal). As a result, a detection error occurs. That is, a position below the position where the object 600 is present is detected as the position where the object 600 is present in the image capturing area 40. Therefore, it is difficult to accurately the position of the object 600.

In the example illustrated in FIG. 46A, the distance data tends to be reduced toward the lower side of the image capturing area 40. That is, the distance data is reduced toward the gravitational direction in the image capturing area 40. As such, when the size of the area (image capturing area 40) capable of detecting the range-finding object increases, it is necessary to consider the gravitational direction so as to correctly recognize the relation between a change in the distance data and the existence of the object and accurately detect the position of the object in the image capturing area 40.

The problems of the range finding method using the two-dimensional sensor will be described with reference to other drawings. FIGS. 48A and 48B are diagrams illustrating an example of the image received by the image capturing area when the range-finding object is indoors. There are targets 601 and 602, which are intended to be range-finding objects, in the image capturing area 40. FIGS. 49A and 49B are graphs illustrating an example of the distribution of distance data for each range-finding area in the image capturing area 40. FIG. 49A illustrates an example of the distance distribution data for columns, in which the vertical axis indicates the reciprocal of the distance and the horizontal axis indicates the position of the range-finding area in the vertical direction. FIG. 49B illustrates an example of the distance distribution data for rows, in which the vertical axis indicates the reciprocal of the distance and the horizontal axis indicates the position of the range-finding area in the horizontal direction.

In the scene illustrated in FIG. 48A, the actual range-finding object can be presumed as the target 601 disposed at the center of the image capturing area. However, when the "short-distance priority mode" is set, as illustrated in the graphs of FIGS. 49A and 49B, the distance data of the object 602 is determined to be a short distance. As a result, the object 602 is falsely recognized as the range-finding object. In particular, because objects are often disposed on the near and far sides in the room, the range finding device using the two-dimensional sensor calculates a lot of distance data that is not related to the intended range-finding object as the number of the distance data increases. Therefore, the range finding device using the two-dimensional sensor requires a technique capable of narrowing the position and range where the range-finding object is present in the image capturing area 40 according to a photographing condition (whether the range-finding object is indoors or outdoors).

The present invention has been made in view of the above described problem, indicating that there is a need for providing a range-finding device, equipped with a two-dimensional sensor, for specifying a position where a range-finding object is present based on the distribution tendency of the distance data output from the two-dimensional sensor and obtaining a range-finding result with higher accuracy by specifying the position of the range-finding object, a range-finding method that is performed by the range-finding device, and an image forming device on which the range-finding device is mounted.

SUMMARY OF THE INVENTION

It is an object of the present invention to at least partially solve the problems in the conventional technology.

A range-finding device includes: a plurality of image capturing elements that are provided at a predetermined interval; a lens that forms an image of a range-finding object on each of the image capturing elements; a distance calculating unit that calculates a distance to the range-finding object for each of a plurality of range-finding areas that are set on the respective image capturing elements based on an image signal output from each of the range-finding areas according to the image that is formed; a distribution generating unit that generates a distribution of the calculated distances; and a position specifying unit that specifies a position where the range-finding object is present in the range-finding area based on the distribution of the distances.

An image capturing device includes: an image capturing element on which an image of an object is formed through an image capturing lens; an image processing unit that generates image data based on a signal output from the image capturing element; and a range-finding device that measures a distance to the object by using an optical system other than the image capturing lens. The range-finding device is the range-finding device mentioned above.

A range-finding method is performed in a range-finding device that includes a plurality of image capturing elements that are provided at a predetermined interval, a lens that forms an image of a range-finding object on the respective image capturing elements, a distance calculating unit that calculates a distance to the range-finding object for each of a plurality of range-finding areas that are set on the respective image capturing elements based on an image signal output from each of the range-finding areas according to the image that is formed, a distribution generating unit that generates a distribution of the calculated distances, and a position specifying unit that specifies a position where the range-finding object is present in the range-finding area based on the distribution of the distances. The range-finding method includes: acquiring an image signal related to the image of the range-finding object formed on the image capturing element; calculating distance data from the image signal; calculating a gradient of the distance data; and specifying a position of the range-finding object in the range finding area based on the distance data.

An image capturing method that is performed in an image capturing device includes an image capturing element on which an image of an object is formed through an image capturing lens, an image processing unit that generates image data based on a signal output from the image capturing element, and a range-finding device that measures a distance to the object by using an optical system other than the image capturing lens. The range finding method that is performed by the range-finding device in response to an operation on a release button is the range finding method mentioned above. The image capturing method includes: measuring a distance to the object using range-finding result obtained by the range finding method; focusing the image of the object formed on the image capturing element according to a distance to the object; and generating an image data based on the image of the object.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21A is a graph illustrating an example of distribution of the range finding results in columns of the range-finding areas, and FIG. 21B is a graph illustrating an example of the distribution of the range finding results in rows of the range-finding areas;

FIG. 26A is a graph illustrating another example of the distribution of the range finding results in the columns of the range-finding areas, and FIG. 26B is a graph illustrating another example of the distribution of the range finding results in the rows of the range-finding areas;

FIG. 27A is a graph illustrating another example of the distribution of the gradients of the range finding data in the columns based on the range finding result;

FIG. 27B is a graph illustrating another example of the distribution of the gradients of the range finding data in the rows based on the range finding result;

FIGS. 31A and 31B are graphs illustrating the range finding results. Specifically, FIG. 31A is a graph illustrating still another example of the distribution in the columns of the range-finding areas, and FIG. 31B is a graph illustrating still another example of the distribution in the rows of the range-finding areas;

FIGS. 37A and 37B are graphs illustrating the range finding results. Specifically, FIG. 37A is a graph illustrating yet another example of the distribution of the range finding results in the columns of the range-finding areas, and FIG. 37B is a graph illustrating yet another example of the distribution of the range finding results in the rows of the range-finding areas;

FIG. 39A is a diagram illustrating still another example of a candidate area extracted on the basis of the distribution of the gradients;

FIG. 39B is a diagram illustrating still another example of a candidate area and peripheral areas extracted on the basis of the distribution of the gradients;

FIG. 40A is a diagram illustrating yet another example of correlation between the object area and the range-finding area determined according to the range-finding object;

FIG. 40B is a diagram illustrating yet another example of correlation between the object area and the range-finding object;

FIG. 41 is a diagram illustrating an example of the object area determined according to the range-finding object;

DETAILED DESCRIPTION OF THE PREFERRED EMBODIMENTS

Figure 1:
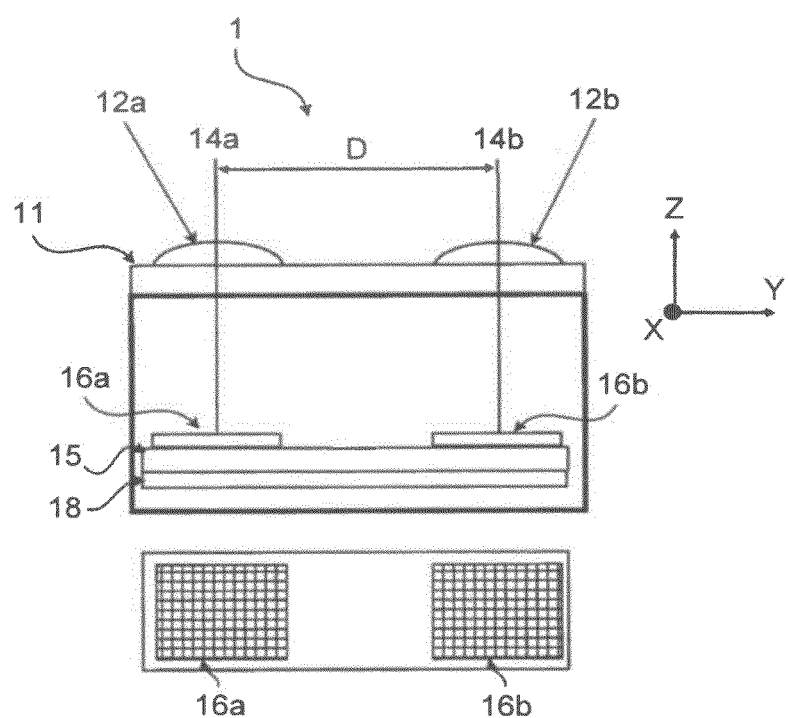
FIG. 1 is a longitudinal section illustrating an example of a range finding device according to an embodiment.

Hereinafter, a range finding device according to an embodiment will be described with reference to the accompanying drawings. FIG. 1 is a longitudinal section schematically illustrating configuration of the range finding device according to the embodiment. A range finding device 1 illustrated in FIG. 1 includes a lens array 11, an image capturing element 15, and a substrate 18.

The lens array 11 includes two lenses (a first lens 12a and a second lens 12b) that are integrally formed and are used for range finding. The first lens 12a and the second lens 12b have a same shape and focal length. An optical axis 14a of the first lens 12a and an optical axis 14b of the second lens 12b are parallel to each other and the space therebetween is a base line length D.

A direction of the range finding device 1 is specified in the present specification, an axis along the optical axis 14a and the optical axis 14b is taken as the Z-axis, a direction that is perpendicular to the Z-axis and is pointing in a direction from the optical axis 14a to the optical axis 14b is taken as the Y-axis, and a direction perpendicular to both the Z-axis and the Y-axis is taken as the X-axis. Furthermore, the positive direction of the X-axis is referred to as an upward direction and the negative direction of the X-axis is referred to as a downward direction. The first lens 12a and the second lens 12b are provided in the X-Y plane such that the centers of the two lenses are arranged on the Y-axis. In a normal state of use, the first lens 12a and the second lens 12b are arranged to point at the Z-axis direction and the first lens 12a and the second lens 12b are on the Y-axis. When the range finding device 1 is inclined at an angle by 90 degrees for use, the first lens 12a and the lens second 12b are in states to point at the Z-axis direction and the first lens 12a and the second lens 12b are on the X-axis. In the normal state, the parallax Δ of the range finding device 1 appears in the Y-axis direction.

The image capturing element 15 includes an image capturing device such as a complementary metal oxide semiconductor (CMOS) or a charge coupled device (CCD) and includes a plurality of light receiving elements (pixels) formed on a silicon wafer by a semiconductor process. In the embodiment, a CCD is used for the image capturing element 15. The image capturing element 15 includes two (first and second) light receiving surfaces 16a and 16b. A first object image that has passed through the first lens 12a is formed on the first light receiving surface 16a. A second object image that has passed through the second lens 12b is formed on the second light receiving surface 16b. The first light receiving surface 16a and the second light receiving surface 16b are arranged such that a space corresponding to the base line length D between the first lens 12a and the second lens 12b is formed between the first and second light receiving surfaces 16a and 16b.

The first light receiving surface 16a and the second light receiving surface 16b have rectangular shapes with a same size and are arranged such that the diagonal centers of the first light receiving surface 16a and the second light receiving surface 16b are substantially aligned with the optical axes of the first lens 12a and the second lens 12b, respectively. As such, in the structure in which the first light receiving surface 16a and the second light receiving surface 16b are arranged so as to be separated from each other, it is not necessary to provide, for example, a wall for preventing the leakage of an incident beam to an adjacent light receiving surface.

The substrate 18 includes a digital signal processor (DSP) that performs predetermined image processing on an image signal output from the image capturing element 15. The range finding device 1 is configured to perform range finding, with the use of the DSP provided in the substrate 18, by performing a predetermined process on an image signal based on the first and second object images formed on the first and second light receiving surfaces 16a and 16b, respectively, through the lens array 11.

Figure 2:
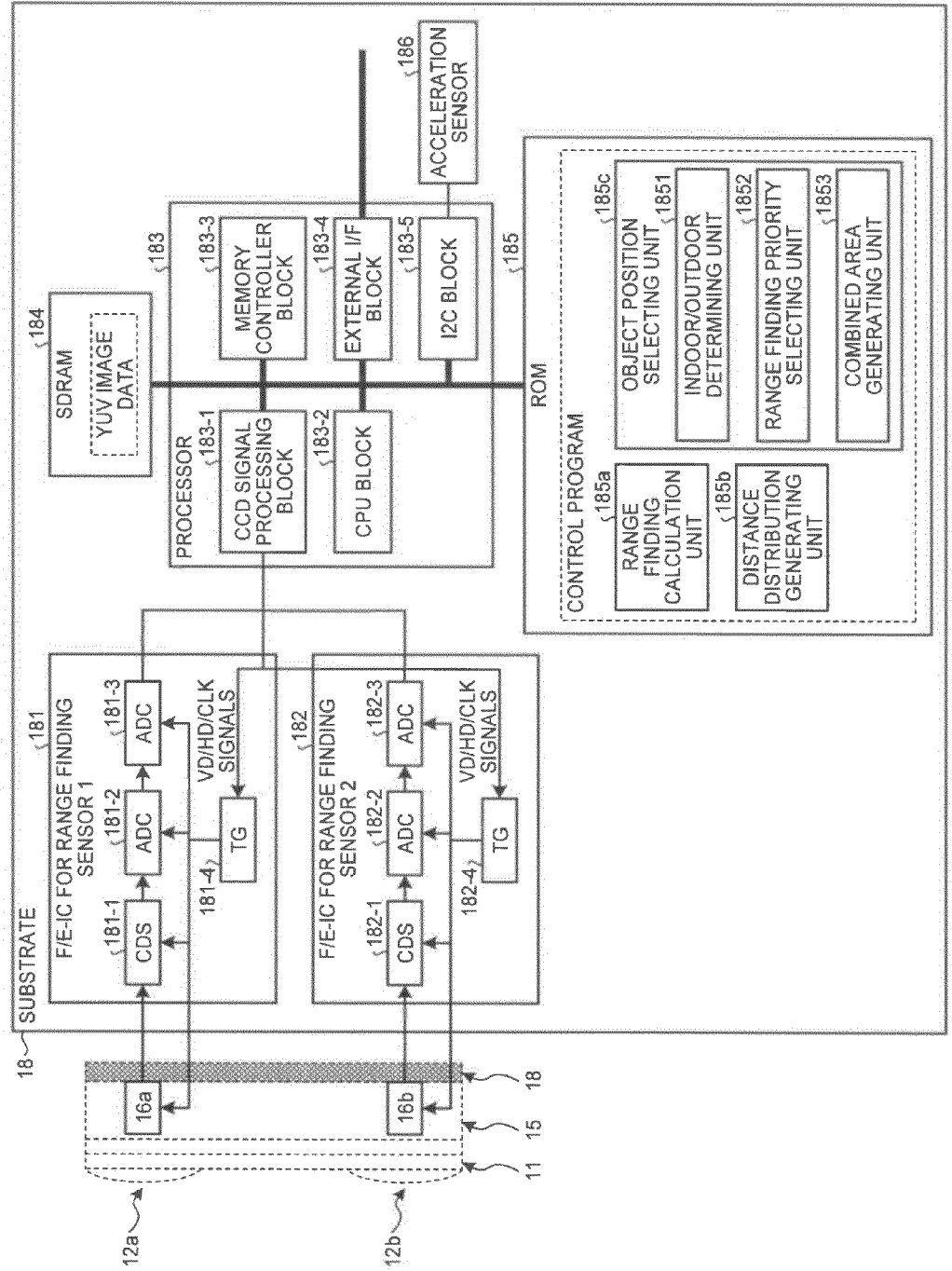
FIG. 2 is a functional block diagram illustrating an example of a control system of the range finding device according to the embodiment.

Next, the functional blocks of the substrate 18 will be described with reference to FIG. 2. In FIG. 2, the substrate 18 includes a front-end integrated circuit (F/E-IC) 181 for a range finding sensor 1, an F/E-IC 182 for a range finding sensor 2, a processor 183, a synchronous dynamic random access memory (SDRAM) 184, a read-only memory (ROM) 185, and an acceleration sensor 186.

The first and second object images respectively captured by the first light receiving surface 16a and the second light receiving surface 16b of the image capturing element 15 are converted into image signals that are input into the substrate 18. The F/E-IC 181 is provided to perform processing on the first image signal based on the image of a range-finding object formed on the first light receiving surface 16a of the image capturing element 15, and includes a correlative double sampling circuit (CDS) 181-1 that converts the image signal corresponding to the first object image formed on the first light receiving surface 16a into digital data, an analog-digital conversion circuit (ADC) 181-2, and an ADC 181-3. The F/E-IC 182 is provided to perform processing on the second image signal based on the image of a range-finding object formed on the second light receiving surface 16b of the image capturing element 15, and includes a CDS 182-1 that converts the image signal corresponding to the second object image formed on the second light receiving surface 16b into digital data, an ADC 182-2, and an ADC 182-3.

The digital data converted from the image signals by the F/E-IC 181 and the F/E-IC 182 is input into a CCD signal processing block 183-1 of the processor 183. The signal processing operation is controlled by vertical driving/horizontal driving/clock (VD/HD/CLK) signals output from the CCD signal processing block 183-1 through a timing generator (TG) 181-4 and a TG 182-4.

The processor 183 controls the overall operation of the range finding device 1 and includes the CCD signal processing block 183-1, a CPU block 183-2, a memory controller block 183-3, an external interface (I/F) block 183-4, and an I2C block 183-5 connected to the acceleration sensor 186, which are connected to each other by a bus line. The SDRAM 184 that stores YUV image data is provided outside the processor 183 and is connected to the processor 183 by the bus line. In addition, the ROM 185 that stores control programs is provided outside the processor 183 and is connected to the processor 183 by the bus line.

The external I/F block 183-4 is an interface that outputs the range finding result based on range finding data calculated by a predetermined calculation process using the digital data and receives a signal related to setting of the range finding mode. The set range finding mode includes a "short-distance priority mode", a "long-distance priority mode", and the like. The mode is changed through designation from an external device (not illustrated) connected through the external I/F block 183-4. The external device is, for example, an image capturing device, such as a digital camera.

The ROM 185 stores various kinds of control programs for controlling a distance calculating unit 185a, a distance distribution generating unit 185b, and an object position selecting unit 185c. The object position selecting unit 185c includes computer programs of an indoor/outdoor determining unit 1851, a range finding priority selecting unit 1852, and a combined area generating unit 1853.

Each control program stored in the ROM 185 allows the CCD signal processing block 183-1 to perform a control process for capturing the image signal synchronized with the VD signal on the image capturing element 15 through the TG 181-4 or the TG 182-4. In the embodiment, the capture timing (hereinafter, referred to as a "frame rate") is 30 frames per second (fps).

Figure 3:
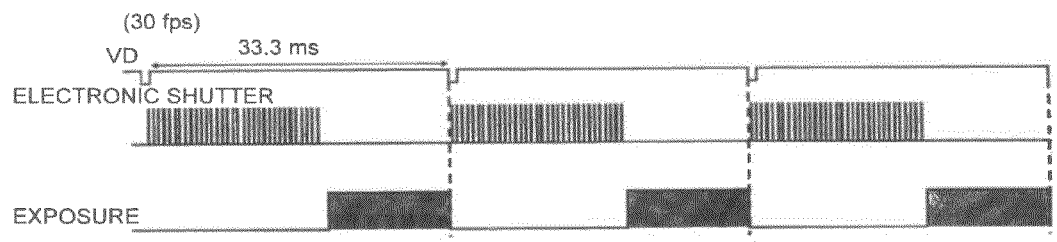
FIG. 3 is a chart illustrating an example of capture timing of an image signal related to the range finding device.

FIG. 3 illustrates an example of a timing chart related to the capture timing of the image signal. In FIG. 3, an electronic shutter operation is performed using a fall of the VD signal as a trigger and then an exposure process is performed. Therefore, the image capturing element 15 is configured so as to control an amount of exposure by the setting of the electronic shutter.

Figure 4:
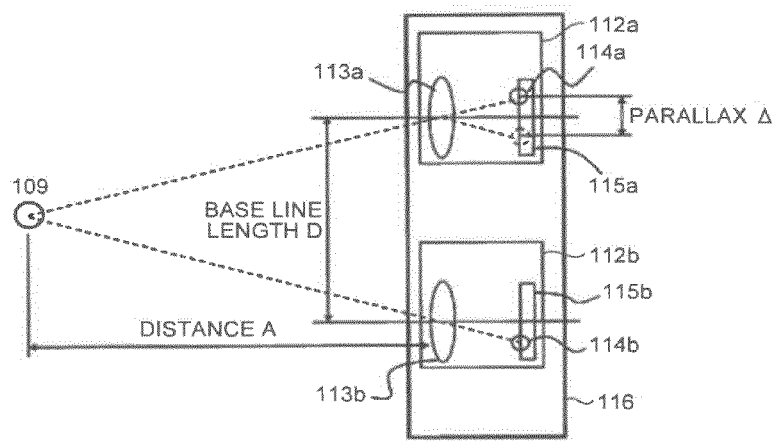
FIG. 4 is a longitudinal section illustrating an example of a range finding device according to the related art.

Here, a method of range finding with parallax using a line sensor will be described. FIG. 4 is a schematic diagram illustrating an example of a range finding device using the line sensor according to the related art. In FIG. 4, positions where image light of a range-finding object is formed in each of two optical systems 112a and 112b is denoted by reference numerals 114a and 114b.

Figure 5:
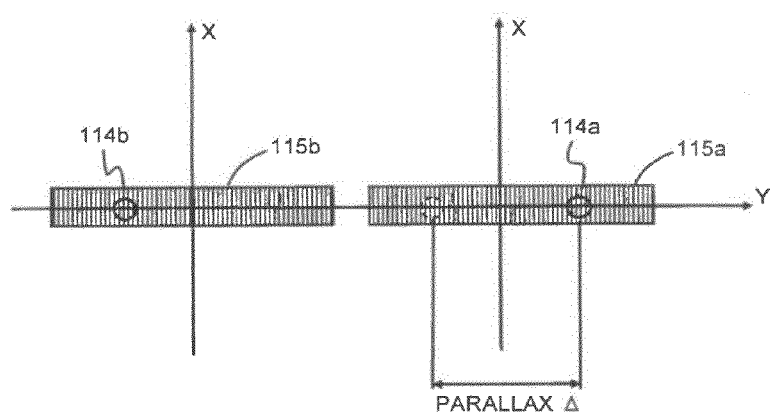
FIG. 5 is an explanatory diagram illustrating an example of the positions of images formed on sensors and parallax between the images in the range finding device according to the related art.

The relation between the image capturing position 114a of a line sensor 115a and the image capturing position 114b of a line sensor 115b will be described with reference to FIG. 5. As illustrated in FIG. 5, the image capturing position 114a and the image capturing position 114b deviate from each other with an amount corresponding to the parallax Δ. Therefore, when the parallax Δ is detected, a distance A (see FIG. 4) to the range-finding object 109 can be calculated on the basis of the image signals output from the line sensor 115a and the line sensor 115b.

An expression for calculating the distance A will be described below. As illustrated in FIG. 4, when the distance between the optical axes of a lens 113a and a lens 113b, that is the base line length, is denoted by D, the distance from the lens 113a and the lens 113b to the range-finding object 109 is denoted by A, the focal length of each lens is denoted by f, and a relation that distance A >>the focal length f is satisfied, the distance A can be calculated by the following Equation 1:

$$A = D \cdot f / \Delta \tag{1}$$

Because the base line length D and the focal length f are known when the range finding device is assembled, the distance A to the range-finding object 109 can be calculated by detecting the parallax Δ and performing the calculation process using Equation 1. As such, the distance can be measured by detecting the difference (parallax Δ) between the image capturing positions using the two line sensors. This method is called a triangulation method. In a range finding device 108 according to the related art, in an entire field of view of the optical system, the line sensor 115a and the line sensor 115b are arranged at the center portions where the resolution of the lenses are high, and the images of the range-finding object 109 are received. Therefore, light is focused at a center of the field of view.

Next, the range finding device according to the embodiment will be described. The range finding device according to the embodiment includes a two-dimensional sensor and performs a range finding process using the above-mentioned triangulation method. As described above, the image capturing element 15 of the range finding device 1 according to this embodiment includes two light receiving surfaces 16a and 16b. Hereinafter, in the specification, both an entire area of the first light receiving surface 16a and an entire area of the second light receiving surface 16b are referred to as an "image capturing area 40". In addition, the image capturing area 40 is divided into areas with a predetermined size, and each of the divided areas is referred to as a "range-finding area 50".

Figure 6:
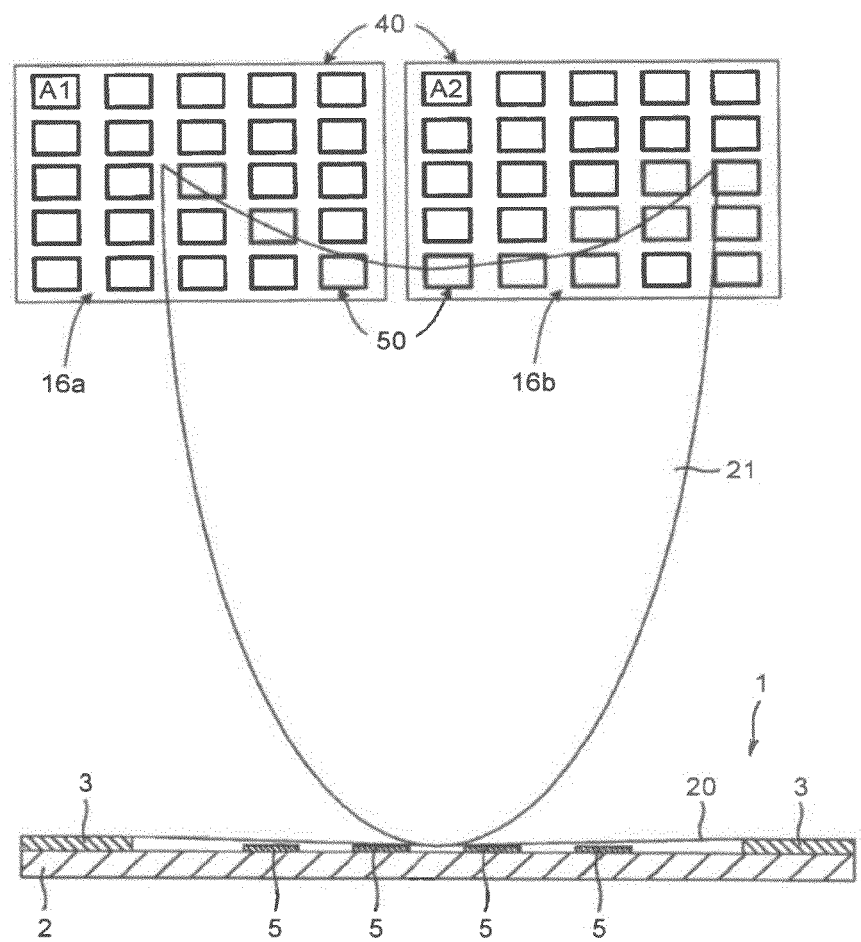
FIG. 6 is a diagram illustrating an example of image capturing areas and range-finding areas in the range finding device according to the embodiment.

In FIG. 6, the image capturing area 40 is divided into five areas in each of vertical and horizontal directions and 25 range-finding areas 50 are obtained. However, the number of range-finding areas in the range finding device according to the embodiment is not limited thereto, and the image capturing area 40 may be divided into an arbitrary number of range-finding areas. In the meantime, the range-finding areas 50 are not physically formed, but are formed by logical setting.

The range finding device 1 performs range finding based on the parallax in each of the range-finding areas 50. That is, the parallax is detected in each of the range-finding areas 50 by the image signal based on an image of a range-finding object received by the respective range-finding areas 50, and distance data is calculated for the respective range-finding area 50. In FIG. 6, the distance data is calculated for a position (an upper left position of the image capturing area 40) by using the parallax between the range-finding area 50 indicated by "A1" and the range-finding area 50 indicated by "A2".

Figure 7:
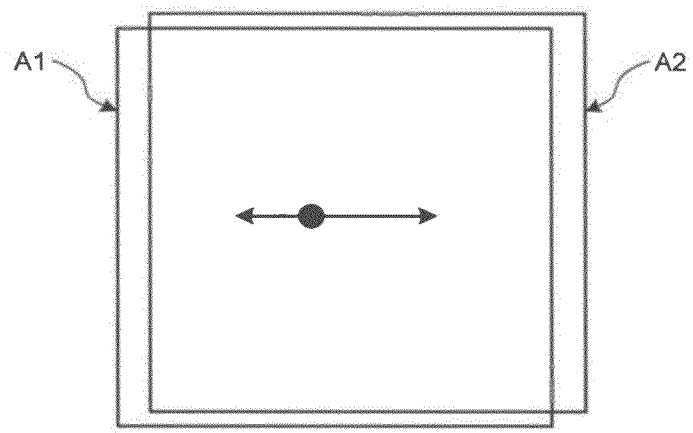
FIG. 7 is a diagram illustrating a method of calculating parallax between the range-finding areas in the range finding device according to the embodiment.

Specifically, as illustrated in FIG. 7, the pixel difference between the range-finding area 50 corresponding to "A1" and the range-finding area 50 corresponding to "A2" is calculated while the above range-finding areas 50 are relatively shifted in the horizontal direction by several pixels and a position where the pixel difference is minimized is determined as the parallax. When an empty image is formed in the range-finding areas 50 and it is difficult to determine the parallax, the parallax is set to "zero" by regarding that the range finding cannot be performed.

Figures 8, 9:
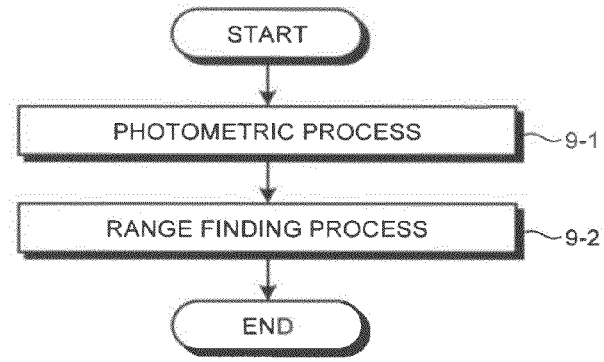
FIG. 8 is a diagram illustrating an example of a light receiving surface of an image capturing element according to the embodiment.
FIG. 9 is a flowchart illustrating an example of a range finding method according to the embodiment.

Because the range finding device according to the embodiment can change the amount of exposure, the range finding device has a simplified photometric function. The entire field of view can be divided into a plurality of areas by a multi-division sensor and the brightness of each divided area can be measured. FIG. 8 is a diagram illustrating an aspect in which the light receiving surface 16a (16b) of the image capturing element is divided.

A signal that is divided as illustrated in FIG. 8 and output to the light receiving surface 16a (16b) is input into the CCD signal processing block 183-1 through the F/E-IC 181 and the F/E-IC 182. The CCD signal processing block 183-1 adds Y values (brightness) in the divided areas and performs multiplication using the number of target pixels from the YUV signals stored in the SDRAM 184, thereby calculating an evaluation value. An appropriate amount of exposure is calculated by a brightness distribution which is obtained from the calculated evaluation value, and the brightness of the range-finding object is detected. According to the detection result, the TG 181-4 and the TG 182-4 can be used to change the speed of the electronic shutter, thereby changing the amount of exposure, for example, an amount of exposure corresponding to a bright range-finding object or an amount of exposure corresponding to a dark range-finding object.

Next, referencing back to FIG. 2, the acceleration sensor 186 connected to the I2C block (183-5) will be described. The acceleration sensor 186 functions as a leveling instrument for detecting the gravitational direction with respect to the range finding device 1 and is used to specify the direction of the range finding device 1. The acceleration sensor 186 outputs an angle and temperature data in three dimensions (X, Y, and Z).

Next, a method of calculating the tilt angle (θ) of the range finding device 1 from the output of the acceleration sensor 186 will be described. Here, a roll angle calculated from the X-axis and the Y-axis is taken as an example. A pitch angle is calculated according to the same method by changing the axes of coordinates. For data output from the acceleration sensor 186, when the output of the acceleration sensor 186 by gravity along the X-axis is denoted by "x", the output of the acceleration sensor by gravity along the Y-axis is denoted by "y", the output of the acceleration sensor related to the temperature is denoted by "t", the output of the acceleration sensor without gravitation is denoted by "g(t)", the ratio of the gravitation along the X-axis and the gravitation along the Y-axis is denoted by R, and a detection angle is denoted by θ, g(t) is calculated by the following Equation 2, R(x, y, t) is calculated by the following Equation 3, and θ is calculated by the following Equation 4:

$$g(t)=2048+0.4\times t \qquad (2)$$

$$R(x,y,t)=(y-g(t))/(x-g(t)) \qquad (3)$$

$$\theta=180/\pi\times\arctan(R(x,y,t))-\theta 0 \qquad (4)$$

When θ is in the range 0°<θ<360°, there are two candidates for θ and one of the two candidates for θ is determined to be chosen on the basis of the sign of x−g(t) in Equation 3. When θ is in the vicinity of +90 degrees, θ90, instead of θ0, is used in Equation 4. In this case, the expression becomes "θ=180/π×arctan (R(x, y, t))−θ90". When θ is in the vicinity of −90 degrees, θ270, instead of θ0, is used in Equation 4. In this case, the expression becomes "θ=180/π×arctan (R(x, y, t))−θ270".

Here, θ0 is a relative roll angle between the image capturing element 15 and the acceleration sensor 186 when the range finding device 1 is in a horizontal state(0°). In addition, θ90 is the relative roll angle between the image capturing element 15 and the acceleration sensor 186 when the range finding device 1 is in a vertical state) (+90°). θ270 is the relative roll angle between the image capturing element 15 and the acceleration sensor 186 when the range finding device 1 is in a vertical state) (−90°. The above-mentioned Equations 2 to 4 may be used to calculate the tilt angle of the range finding device 1.

First Embodiment

A range finding device according to a first embodiment will be described with reference to the drawings. The operation of the range finding device 1 according to the first embodiment is performed by each control program stored in the ROM 185

(see FIG. 2). FIG. 9 is a flowchart illustrating an example of the flow of a range finding method performed by the range finding device 1 according to the first embodiment. As illustrated in the flowchart of FIG. 9, first, the range finding device 1 according to the first embodiment performs a photometric process (9-1) and then a range finding process (9-2) using an exposure setting corresponding to the result of the photometric process. It is assumed that the "range finding method" performed by the range finding device 1 according to the first embodiment includes the photometric process (9-1) and the range finding process (9-2) as illustrated in FIG. 9.

Figure 10:
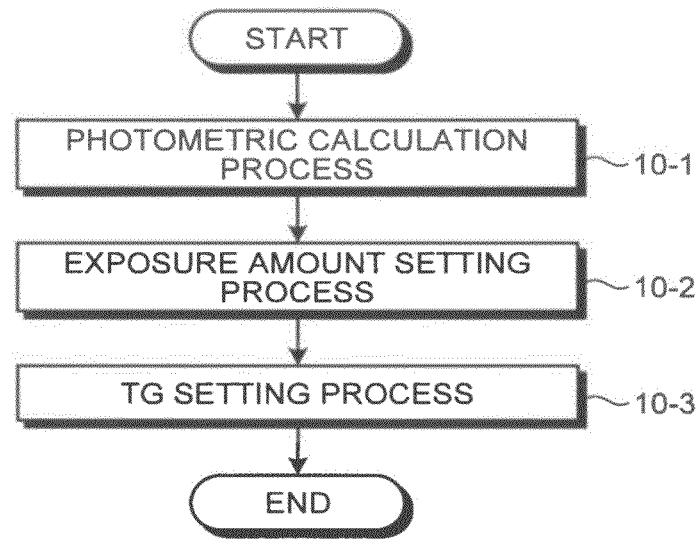
FIG. 10 is a flowchart illustrating an example of a photometric process related to the range finding method.

The photometric process (9-1) will be described below with reference to the flowchart illustrated in FIG. 10. First, a photometric calculation process is performed to convert an image signal that is output according to images of a range-finding object formed on the first light receiving surface 16a and the second light receiving surface 16b of the image capturing element 15 through the optical system into YUV signals using a CCD signal processing block 184-1 and to calculate an exposure evaluation value on the basis of the YUV image signals (10-1). Then, an exposure amount setting process is performed to detect a Y value (brightness) of the range-finding object according to the calculated evaluation value and to set an appropriate amount of exposure (the shutter speed of an electronic shutter) (10-2). Then, a TG setting process for setting the TG of the image capturing element 15 is performed on the basis of the set amount of exposure (10-3).

Figure 11:
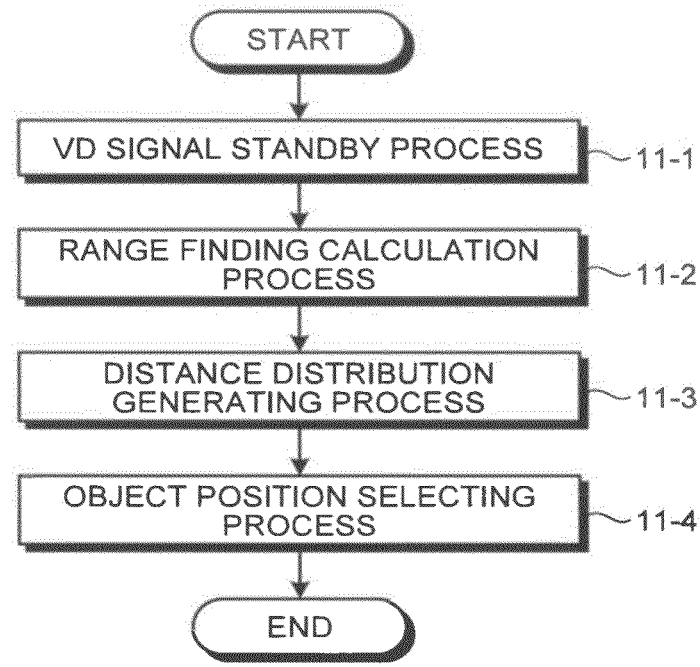
FIG. 11 is a flowchart illustrating an example of a range finding process related to the range finding method.

Returning to FIG. 9, as described above, a process for exposing the image capturing element 15 is performed on the basis of the amount of exposure set in the exposure amount setting process (10-2) to acquire an image signal and the range finding process (9-2) is performed. The range finding process (9-2) will be described below with reference to the flowchart illustrated in FIG. 11. First, a VD signal standby process is performed so as to acquire the exposure timing of two image capturing elements 15 that are sensors for range finding (11-1). Then, a range-finding calculation process is performed for each range-finding area 50 on the basis of the image signal obtained by converting the exposed image signal into YUV signals using the CCD signal processing block 184-1 (11-2). The range-finding calculation process (11-2) calculates the distance using the parallax between the range-finding areas 50 that are disposed at the same position in two image capturing areas 40, as described with reference to FIG. 7.

Figure 18A:
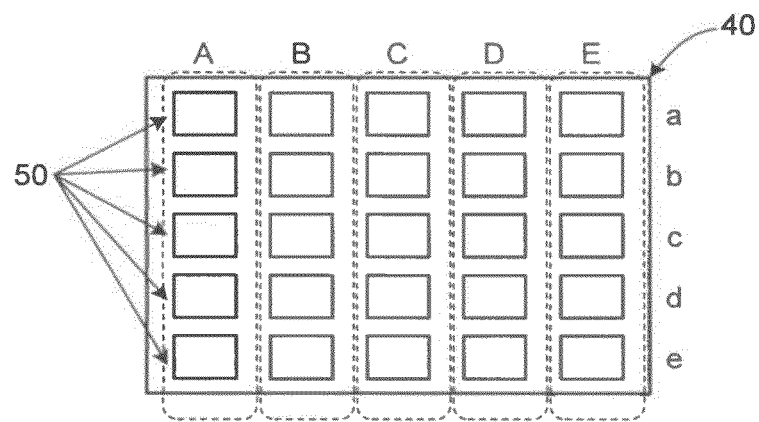
FIGS. 18A and 18B are diagrams illustrating an example of an image capturing area and range-finding areas which are mounted on an image capturing element of the range finding device according to the embodiment.
Figure 18B:
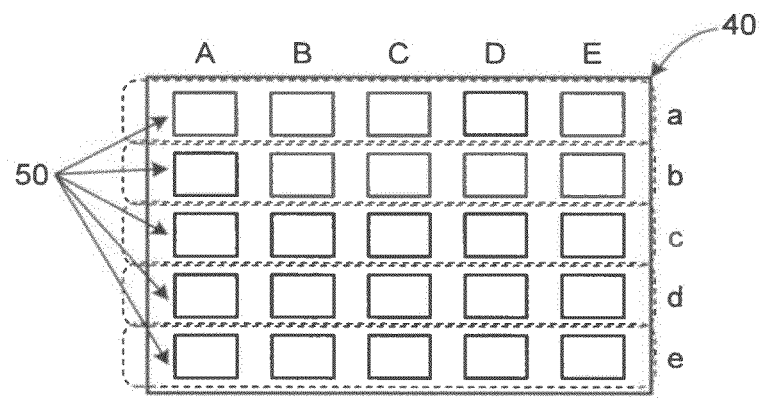

Next, the configuration of the range-finding area 50 will be described. As described with reference to FIG. 6, the range-finding area 50 is a set of pixels with a predetermined size having been set on the light receiving surface of the image capturing element 15. An example of the range-finding area 50 is illustrated in FIGS. 18A and 18B. FIGS. 18A and 18B are schematic diagrams illustrating the set state of the range-finding areas in two light receiving surface areas (in the first and second light receiving surfaces 16a and 16b) of the image capturing element 15 that is provided in the range finding device 1. In FIGS. 18A and 18B, there are two image capturing areas 40. Each of the image capturing area 40 includes five columns and five rows of range-finding areas 50, amounting to 25 range-finding areas 50.

In the present specification, description is given of the first embodiment by using the image capturing area 40 that is divided into five columns and five rows of range-finding areas 50. Therefore, reference characters A, B, C, D, and E are assigned to the range-finding areas 50 arranged in the column direction and reference characters a, b, c, d, and e are assigned to the range-finding areas 50 arranged in the row direction, respectively. In the following description, when the range-finding areas 50 are distinguished, these reference characters will be used. For example, the range-finding area 50 disposed on the upper left corner of FIG. 18A or FIG. 18B is referred to as a "range-finding area 50Aa". In FIGS. 18A and 18B, there is a space between adjacent range-finding areas 50. However, in practice, it is not necessary to provide the space between adjacent range-finding areas 50.

Returning to FIG. 11, using the distance data of the respective range-finding areas 50 calculated in the range-finding calculation process (11-2), a distance distribution generating process is performed for calculating the distribution of distance data for each of the vertical lines of the range-finding areas 50 and each of the horizontal lines of the range-finding areas 50 (11-3). The distance distribution data varies depending on the surrounding environment of the range-finding object. First, a case in which the range-finding object is indoors will be described.

Figure 19A:
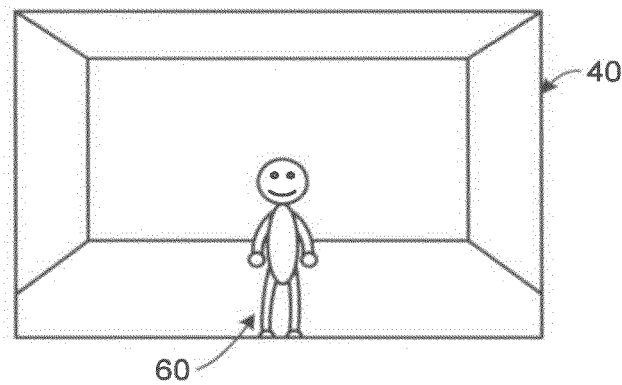
FIG. 19A is a diagram illustrating an example of a range-finding object used to describe the operation of the range finding device according to the embodiment.
Figure 19B:
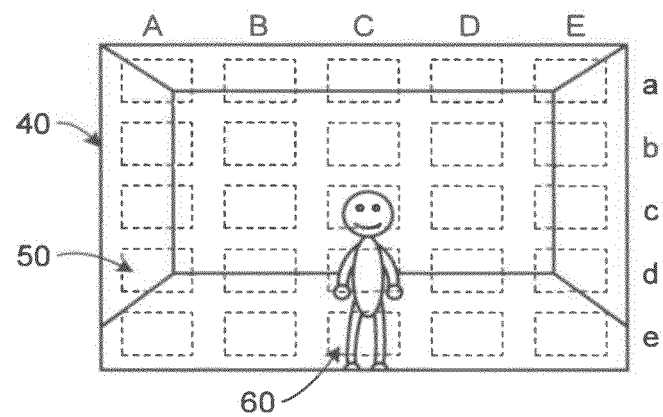
FIG. 19B is a diagram illustrating an example of the correlation between the range-finding object and the range-finding area according to the embodiment.

FIGS. 19A and 19B are diagrams illustrating an example in which the range-finding object is indoors. FIG. 19A illustrates a state in which a range-finding object 60 is indoors and is disposed in the vicinity of the center of the image capturing area 40. FIG. 19B illustrates a state in which the range-finding area 50 is superposed onto FIG. 19A.

Figure 20:
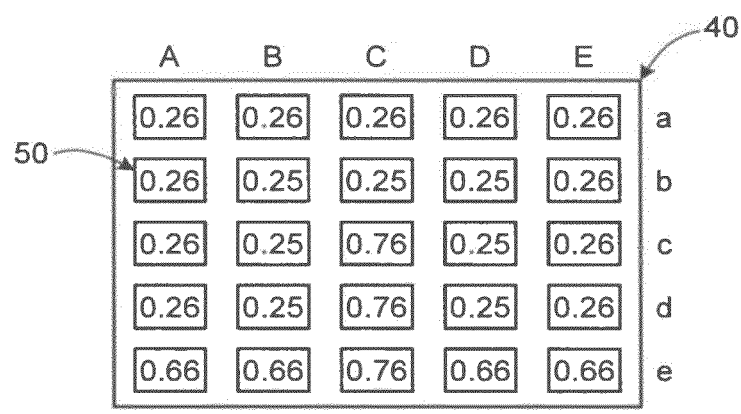
FIG. 20 is a diagram illustrating an example of range finding results for each of the range-finding areas obtained by the range finding device according to the embodiment.

An example of the distance data of each of the range-finding areas 50 in the state of FIGS. 19A and 19B is illustrated in FIG. 20. For example, numbers in the range-finding areas 50 illustrated in FIG. 20 are the reciprocals of the distance data calculated for the range-finding areas 50 in the range-finding calculation process (11-2). That is, in FIG. 20, as the number in each range-finding area 50 increases, the distance to the range-finding object is shorter. Use of the reciprocal of the distance makes it possible to perform the calculation process even when a distance cannot be calculated (when the distance is found to be "0").

Figure 21A:
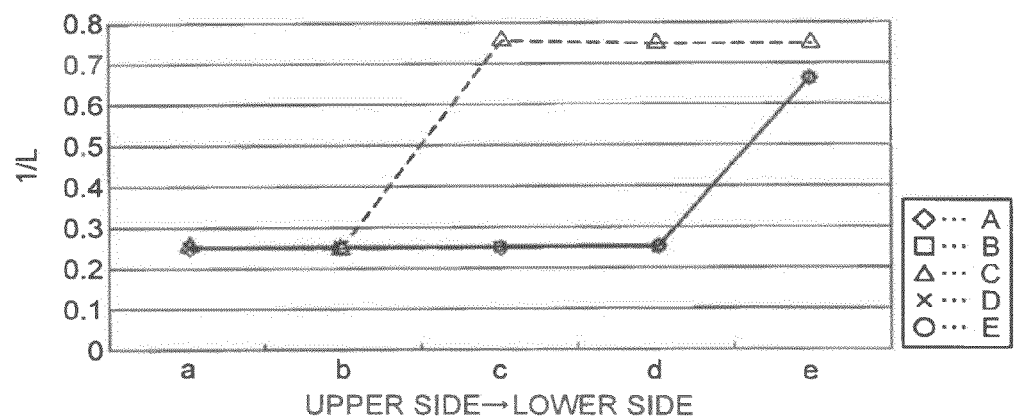
FIGS. 21A and 21B are graphs illustrating the range finding results. Specifically.
Figure 21B:
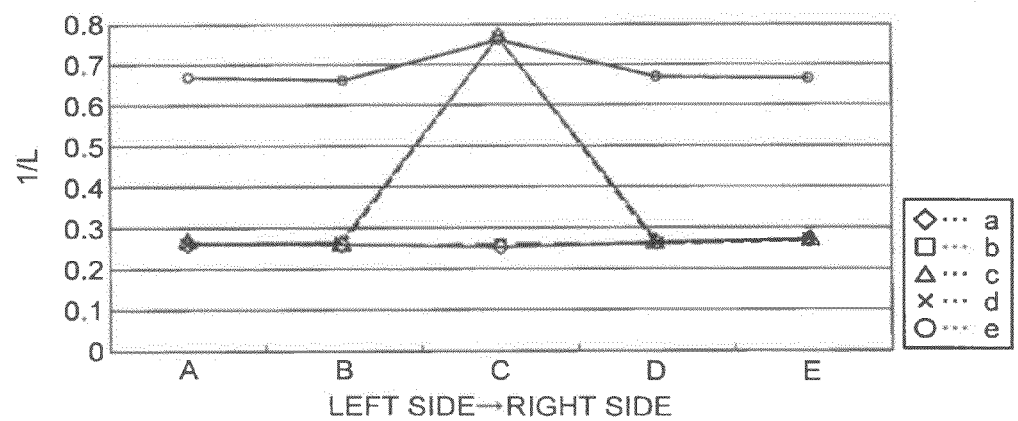

The distance distribution generating process (11-3) is a process that generates a distance distribution data for each of the columns and rows of the range-finding areas 50 from the distance data exemplified in FIG. 20. As an example of the distance distribution generating process (11-3), a process is used for generating a graph that indicates the displacement of the distance data according to the positions of the range-finding areas 50. FIGS. 21A and 21B illustrate examples of graphs indicating the distance distribution data generated by the distance distribution generating process (11-3). In each of the graphs illustrated in FIGS. 21A and 21B, the vertical axis indicates reciprocals of the distance data and the horizontal axis indicates positions of the range-finding areas 50.

FIG. 21A is a graph illustrating the distance distribution data for columns A to E, in which the horizontal axis indicates the position of rows (a to e) of the range-finding areas 50. FIG. 21B is a graph illustrating the distance distribution data for the rows a to e, in which the horizontal axis indicates the position of the columns (A to E) of the range-finding areas 50. In the graph illustrating an example of the distance distribution data in the specification, the same vertical and horizontal axes as those in FIGS. 21A and 21B are used below.

As illustrated in FIGS. 21A and 21B, in an indoor environment and when the range-finding object 60 is disposed only in the vicinity of the center of the image capturing area 40, a variation in the range finding data is large in the center column C of the range-finding areas 50 in the horizontal direction. And a variation in the distance data is large in the center row c of the range-finding area 50 in the vertical direction.

Figure 12:
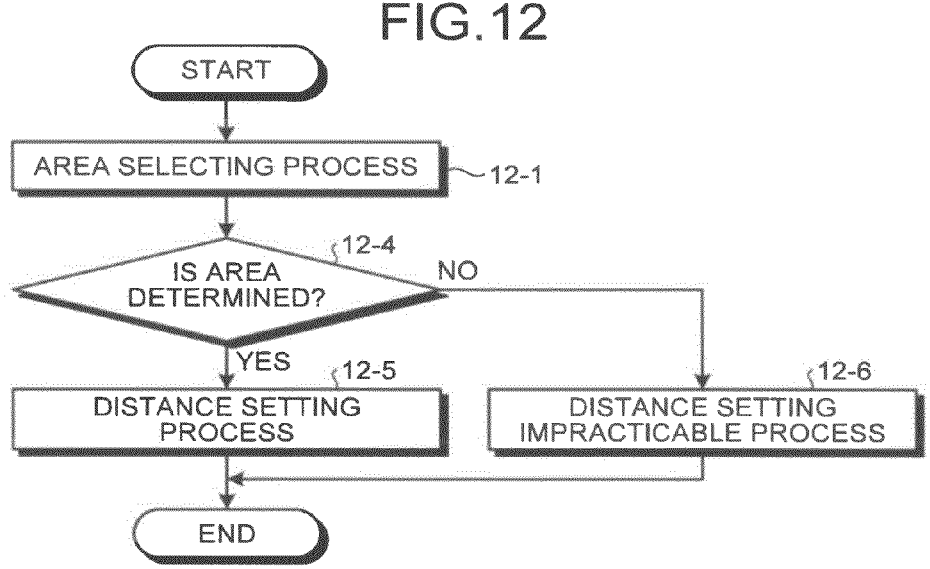
FIG. 12 is a flowchart illustrating an example of an object position selecting process related to the range finding process.
Figure 13:
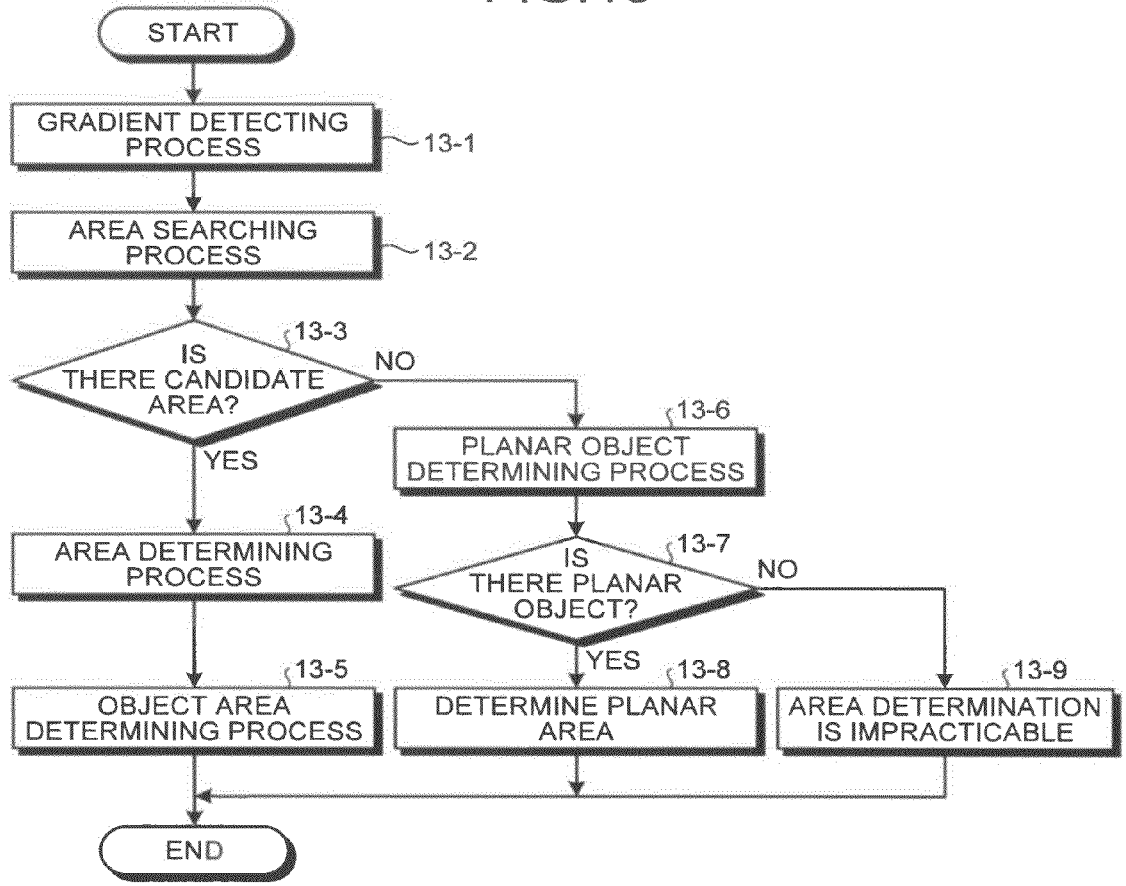
FIG. 13 is a flowchart illustrating an example of an area selecting process related to the object position selecting process.

Returning to FIG. 11, then, an object position selecting process for selecting the position of the object 60 in the range-finding area 50 is performed on the basis of the distance distribution data generated by the distance distribution generating process (11-3) (11-4). The object position selecting process (11-4) will be described in detail with reference to the flowchart illustrated in FIG. 12. First, the gradients of the distance data in each column is calculated on the basis of the distance distribution data for each range-finding area 50 generated by the distance distribution generating process (11-3). An area selecting process (12-1) for selecting the range-finding area 50, in which the object is present, is performed on the basis of the gradients. The area selecting process will be described in detail with reference to the flowchart illustrated in FIG. 13.

First, a gradient detecting process (13-1) is performed. The gradient detecting process (13-1) calculates the gradients of the distance data for each column and row of the range-finding areas 50. The "gradient of the distance data" means the absolute value of the difference between the distance data belonging to the adjacent range-finding areas 50. The gradient will be described using the distance data illustrated in FIG. 20 as an example. For example, the gradient of a range-finding area 50Ab is the difference between the distance data (0.26) of a range-finding area Ab and the distance data (0.26) of a range-finding area Aa and therefore, it is determined that "the gradient is zero". Similarly, the gradient of a range-finding area 50Cc is the difference between the distance data (0.76) of a range-finding area Cc and the distance data (0.25) of a range-finding area Cb and therefore, it is determined that "the gradient is 0.51".

As such, the gradient is the difference between the distance data in the adjacent range-finding areas 50. In the first embodiment, the gradient of the column A and the gradient of the row a are calculated as follows. The distance data of the column B is subtracted from the distance data of the column A. When the subtraction result is negative, the gradient is set to be zero, and when the subtraction result is positive, the absolute value of the difference is used as the gradient. In addition, the distance data of the row b is subtracted from the distance data of the row a. When the subtraction result is negative, the gradient is set to be zero, and when the subtraction result is positive, the absolute value of the difference is used as the gradient.

Figure 22A:
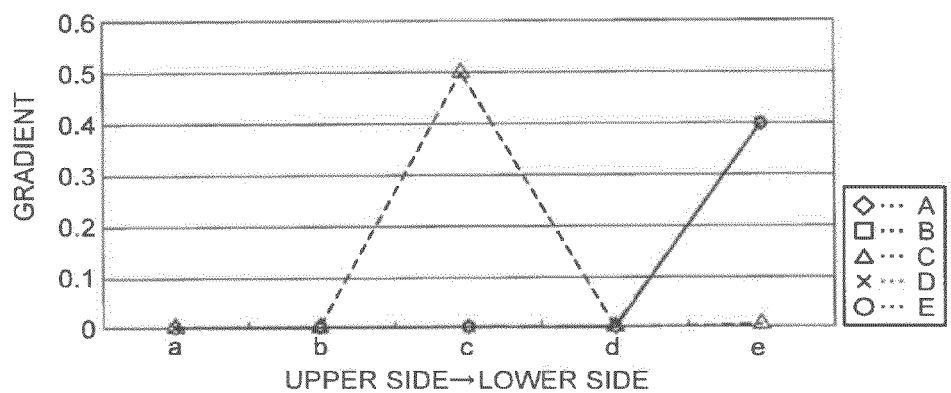
FIG. 22A is a graph illustrating an example of distribution of gradients of range finding data in the columns based on the range finding result.
Figure 22B:
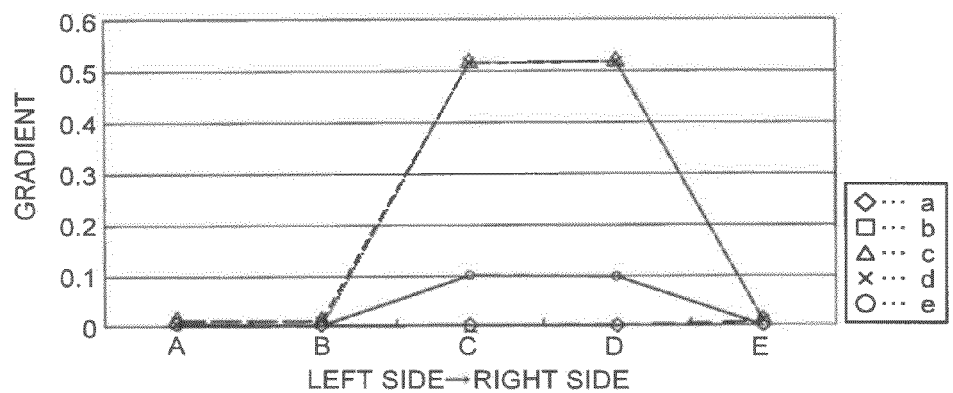
FIG. 22B is a graph illustrating an example of the distribution of gradients of range finding data in the rows based on the range finding result.

FIGS. 22A and 22B are an example of a graph illustrating the gradient of the distance data illustrated in FIG. 20. In the graphs illustrated in FIGS. 22A and 22B, the vertical axis indicates the magnitude of the gradient and the horizontal axis indicates the position of each range-finding area 50. FIG. 22A is a graph illustrating the gradient of the distance data for the columns A to E, in which the horizontal axis indicates the rows (a to e) of the range-finding areas 50. FIG. 22B is a graph illustrating the gradients of the distance data for the columns A to E, in which the horizontal axis indicates the columns (A to E) of the range-finding areas 50.

Then, an area searching process that searches for the position of the range-finding area 50 in which the object 60 is present is performed from the calculated gradients (13-2). First, a first point indicating a rapid change in the gradient (gradient in the row direction) in the column of the range-finding areas 50 is extracted. For example, as illustrated in FIG. 22A, the gradient of the column C rapidly changes at the position of the row c. In addition, in the columns A, B, D, and E, the gradients rapidly change at the position of the row e. Therefore, the rows c and e are extracted.

As illustrated in FIG. 22B, the gradient of the column c rapidly changes at the positions of the rows C and D. Therefore, the column C is extracted.

Figure 23A:
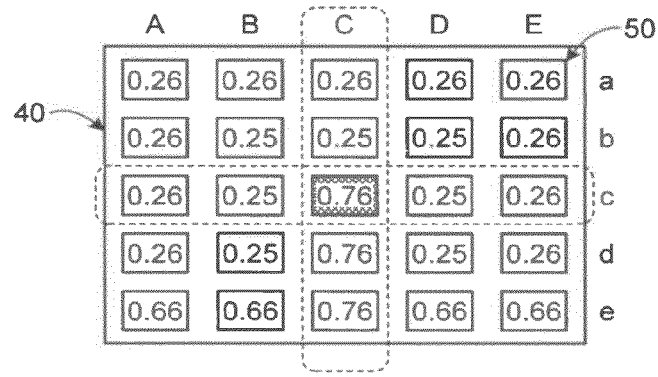
FIG. 23A is a diagram illustrating an example of a candidate area extracted on the basis of the distribution of the gradients.

As such, a point where the gradient, that is a difference between the distance data in the adjacent range-finding areas 50, rapidly changes is extracted in the columns and the rows, and a point where the gradient rapidly changes commonly in the column and the row is specified. In the example illustrated in FIGS. 22A and 22B, the common range-finding area 50 where the gradient rapidly changes commonly in the column and the row is the range-finding area 50Cc as illustrated in FIG. 23A. The range-finding area 50Cc becomes a candidate of the area in which the object 60 is present.

Figure 14:
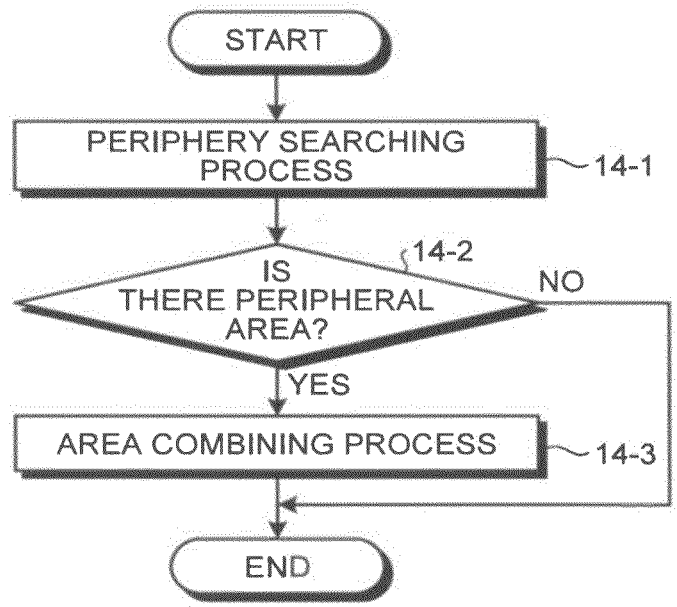
FIG. 14 is a flowchart illustrating an example of an area determining process related to the object area selecting process.

Then, when the candidate area is specified in the area searching process (13-2) (YES in 13-3), an area determining process (13-4) is performed. The area determining process (13-4) will be described with reference to the flowchart illustrated in FIG. 14. First, a process to search for the periphery of the candidate area (the range-finding area 50Cc in FIG. 20) is performed (14-1). The periphery searching process (14-1) extracts peripheral range-finding areas 50 with the same distance data as that of the candidate area because the object 60 may not be within the range of one range-finding area 50, but may extend over a plurality of range-finding areas 50.

Figure 23B:
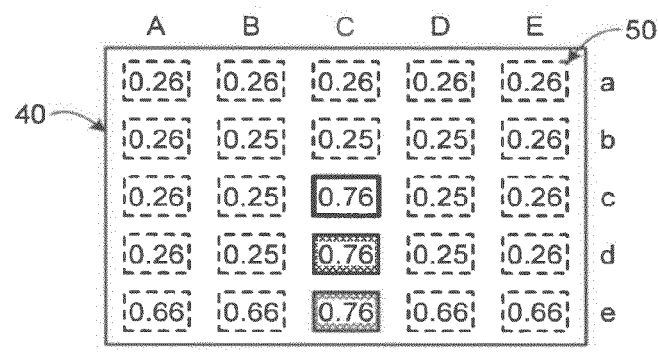
FIG. 23B is a diagram illustrating an example of the candidate area and peripheral areas extracted on the basis of the distribution of the gradients.

Because the distance data of the candidate area (range-finding area 50Cc) specified in FIG. 23A is "0.76", the periphery searching process (14-1) extracts the range-finding areas 50 with the distance data of "0.76" from the range-finding areas 50 around the range-finding area 50Cc. As illustrated in FIG. 23B, because the distance data of the range-finding area 50Cd and the range-finding area 50Ce are both "0.76", the range-finding area 50Cd and the range-finding area 50Ce correspond to the peripheral areas.

In the periphery searching process (14-1), the peripheral area may include, in addition to the range-finding areas 50 with the same distance data as that of the candidate area, the range-finding area 50 with an approximated distance within a predetermined range of the distance data for the candidate area. In this case, the range of the numerical value for the approximation may be set in advance and stored in the ROM (185).

Returning to FIG. 14, when the peripheral areas are extracted by the periphery searching process (14-1) (YES in 14-2), an area combining process (14-3) is performed on the extracted (specified) peripheral areas (range-finding areas 50Cd and 50Ce) as the range-finding areas 50 in which the object 60 is present. The area combining process (14-3) stores, in a storage unit (not illustrated), the range-finding area 50Cc, which is the candidate area, and the range-finding areas 50Cd and 50Ce, which are the peripheral areas, as the areas in which the object 60 is present. In the periphery searching process (14-1), when no peripheral area is specified (NO in 14-2), only the candidate area (range-finding area 50Cc) is stored as the area in which the object 60 is present in the storage unit (not illustrated).

Figure 24A:
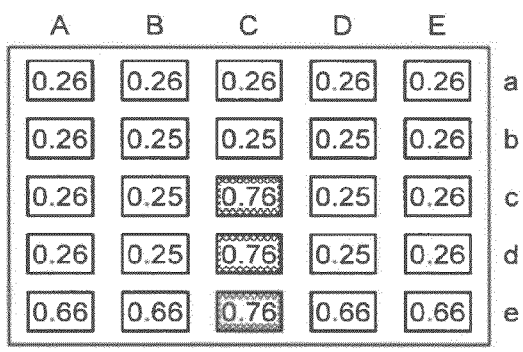
FIG. 24A is a diagram illustrating an example of correlation between an object area and the range-finding area determined according to the range-finding object.
Figure 24B:
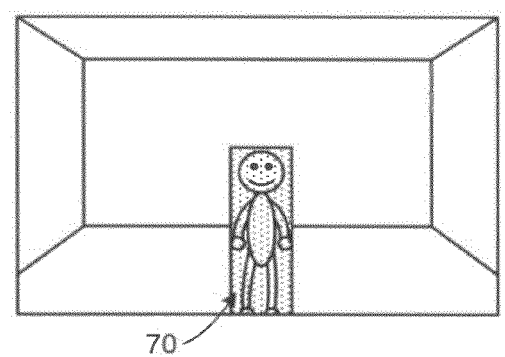
FIG. 24B is a diagram illustrating an example of correlation between the object area and the range-finding object.

Returning to FIG. 13, after the area determining process (13-4), an object area determining process is performed (13-5). The object area determining process (13-5) sets an object area on the basis of the result of the area determining process (13-4). Specifically, an area obtained by combining the range-finding area 50Cc which is determined to be the candidate area with the range-finding areas 50Cd and 50Ce which are specified as the peripheral areas is determined to be an object area 70 (13-5). The object area is used during an auto-focusing (AF) process in the image capturing process that is performed after the range finding process. An example of the object area 70 is illustrated in FIG. 24B.

Figure 25A:
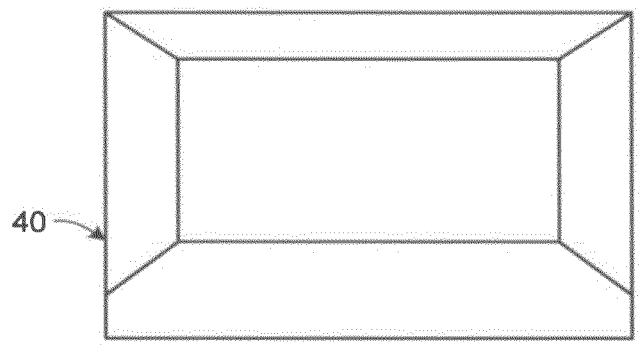
FIG. 25A is a diagram illustrating another example of the range-finding object used to describe the operation of the range finding device according to the embodiment.
Figure 25B:
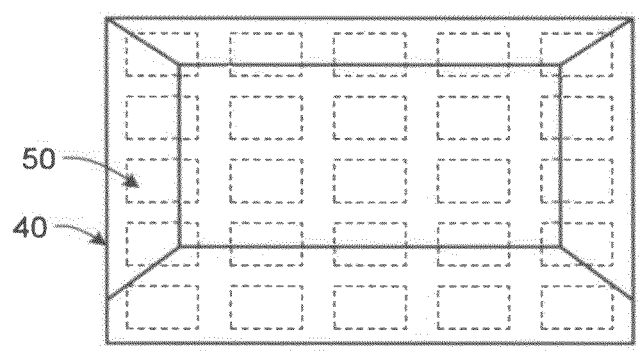
FIG. 25B is a diagram illustrating another example of the correlation between the range-finding object and the range-finding area according to the embodiment.
Figure 25C:
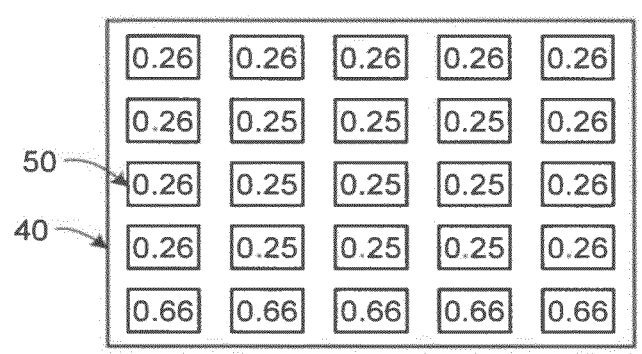
FIG. 25C is a diagram illustrating another example of range finding results for respective range-finding areas.

In the area searching process (13-2), when there is no candidate area (NO in 13-3), a planar-object determining process (13-6) for determining whether the object is a planar object is performed. The planar object determining process (13-6) determines whether there is a planar object on the basis of the tendency of the gradient. The planar-object determining process (13-6) will be described in detail with reference to FIGS. 25A to 28B. For example, when the image illustrated in FIG. 25A is captured in the image capturing area 40, the distance data of each range-finding area 50 is as illustrated in FIG. 25C because only a wall, a ceiling, and a floor are viewed in the image without a person or an object. Therefore, the distance data of each range-finding area 50 is substantially constant.

Figure 26A:
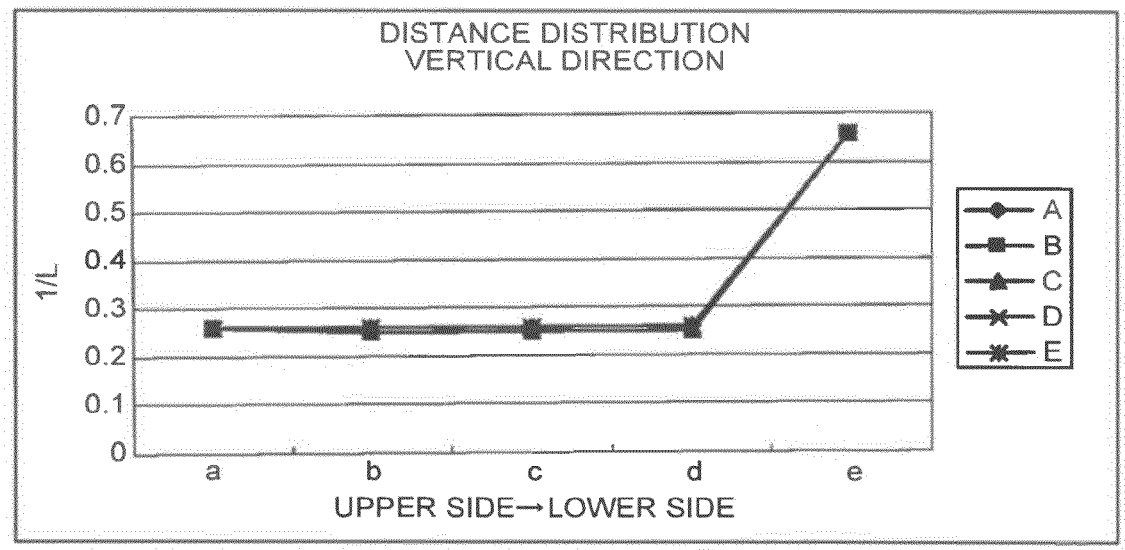
FIGS. 26A and 26B are graphs illustrating the range finding results. Specifically.
Figure 26B:
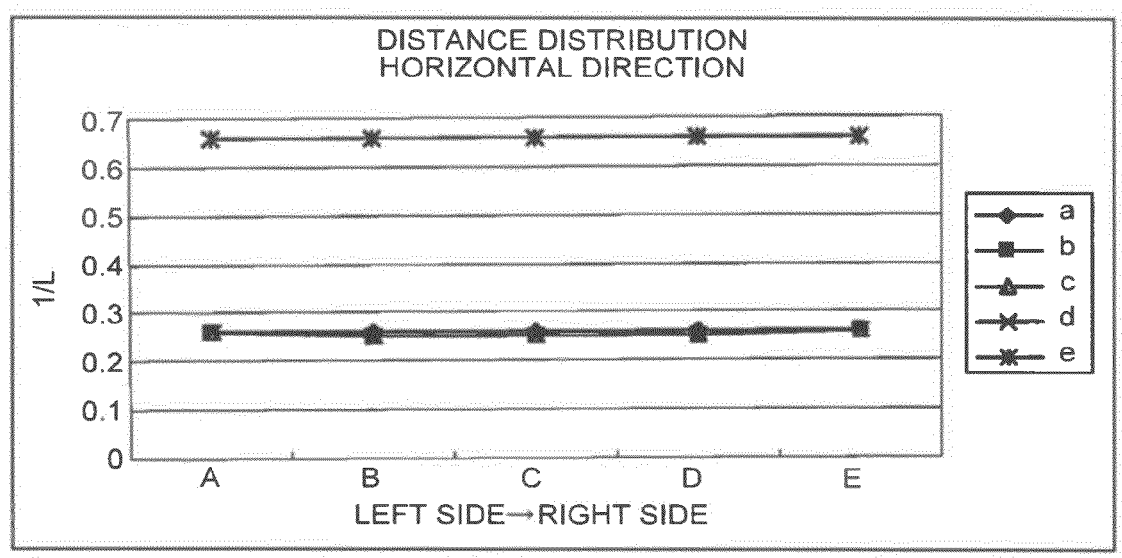

The distance distribution data illustrated in FIG. 25C is illustrated in FIGS. 26A and 26B. In the case of a planar object, the distributions (FIG. 26A) of the range-finding areas 50 in the columns have the same tendency. The values of the range-finding areas 50Ae to 50Ee corresponding to the row e that includes the floor are large, but the other range-finding areas 50 have substantially the same distance data. In addition, the distributions (FIG. 26B) of the distance data in the rows have substantially the same value except for the row e that includes the floor.

When the gradients of the distance data are calculated by the gradient detecting process (13-1 in FIG. 13), as illustrated in FIGS. 27A and 27B, for the gradient (FIG. 27A) of the column, only the gradient of the row e is large, and the other gradients are substantially zero. The gradient (FIG. 27B) of the row is substantially constant and is a small value that is close to zero.

As such, when the gradient is detected only at a predetermined point in the column or the row and is close to zero at other points, the object is determined to be a planar object.

Figure 28A:
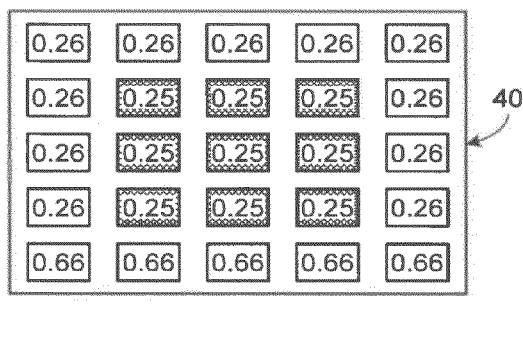
FIG. 28A is a diagram illustrating another example of the correlation between the range-finding object and the object area determined according to the range-finding object.
Figure 28B:
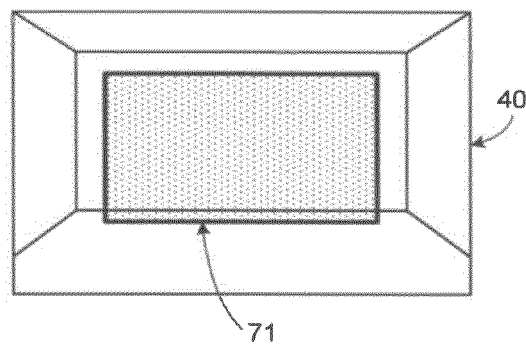
FIG. 28B is a diagram illustrating another example of the correlation between the range-finding area and the object area.

In the planar object determining process (13-6), when it is determined that the object is a planar object (YES in 13-7), the range-finding area 50Cc that is disposed at the center of the image capturing area 40 and the range-finding areas 50 that are disposed around the range-finding area 50Cc are determined as the planar area (13-8). FIGS. 28A and 28B illustrate an example of the planar area. In FIG. 28B, an object area 71 is the planar area.

In the planar object determining process (13-6), when the object is not determined as a planar object (NO in 13-7), it is difficult to determine the area in which the object is present and it is determined that "determination is impracticable" (13-9). As such, in the area selecting process (12-2), the range-finding area 50 in which a range-finding object is present can be selected.

Returning to FIG. 12, in the area selecting process (12-1), when the object area 70 or the object area 71 is determined (YES in 12-4), a distance setting process is performed on the range finding data of the range-finding area 50 corresponding to the object area 70 or the object area 71 (12-5). In the distance setting process (12-5), when there is a combined area or a planar area, the average value of the range finding results from the plurality of areas is set as an object distance. In the area determining process (12-2), when no area is determined, a distance setting impracticable process (12-6) is performed. In the distance setting impracticable process (12-6), infinity is set as the position of the object. When the range finding device 1 is applied to an image capturing device, such as a digital camera, the position of the object is not set to infinity, but may be set to hyperfocal distance of the image capturing device.

After the distance setting process (12-5) or the distance setting impracticable process (12-6), the range finding process (9-2) illustrated in FIG. 9 ends. The above-mentioned processes are repeatedly performed while the range finding device 1 is operating. In this way, a range finding process suitable for the environment of an object can be performed constantly.

Second Embodiment

Next, a range finding device according to another embodiment (a second embodiment) will be described. The second embodiment relates to an example of a process performed when there is a plurality of range-finding objects in the image capturing area 40. Similarly to the first embodiment, various kinds of operations of the range finding device 1 according to the second embodiment are performed by respective control programs stored in the ROM 185 (see FIG. 2).

FIG. 9 is a flowchart illustrating an example of the flow of a range finding method performed in a range finding device 1 according to the second embodiment. As illustrated in the flowchart of FIG. 9, the range finding device 1 according to the second embodiment performs a photometric process (9-1) and then performs a range finding process (9-2) using an exposure setting corresponding to the result of the photometric process. The "range finding method" performed by the range finding device 1 according to the second embodiment includes the photometric process (9-1) and the range finding process (9-2) illustrated in FIG. 9.

The photometric process (9-1) will be described below with reference to the flowchart illustrated in FIG. 10. First, a photometric calculation process is performed to convert an image signal that is output according to the image of a range-finding object formed on the light receiving surface 16a and the light receiving surface 16b of the image capturing element 15 through an optical system into YUV signals using the CCD signal processing block 184-1 and calculates an exposure evaluation value on the basis of the YUV image signals (10-1). Then, an exposure amount setting process that detects the Y value (brightness) of the range-finding object is performed on the basis of the calculated evaluation value and sets an appropriate amount of exposure (the shutter speed of an electronic shutter) (10-2). Then, a TG setting process for setting the TG of the image capturing element 15 on the basis of the set amount of exposure is performed (10-3).

Returning to FIG. 9, as described above, a process for exposing the image capturing element 15 is performed on the basis of the amount of exposure set in the exposure amount setting process (10-2) to acquire an image signal and the range finding process (9-2) is performed. The range finding process (9-2) will be described below with reference to the flowchart illustrated in FIG. 11. First, a VD signal standby process is performed so as to acquire the exposure timing of two image capturing elements 15 which are sensors for range finding (11-1). Then, a distance calculating process is performed for each of the range-finding areas 50 on the basis of the image signal obtained by converting the exposed image signal into YUV signals using the CCD signal processing block 184-1 (11-2). The distance data of each of the range-finding areas 50 is calculated by the range-finding calculation process (11-2).

A distance distribution generating process that calculates the distribution of distance data for each vertical line of the range-finding areas 50 and each horizontal line of the range-finding areas 50 is performed using the distance data of each of the range-finding areas 50 calculated by the range-finding calculation process (11-2) (11-3). In the second embodiment, a case in which a plurality of range-finding objects is indoors will be described.

Figure 29A:
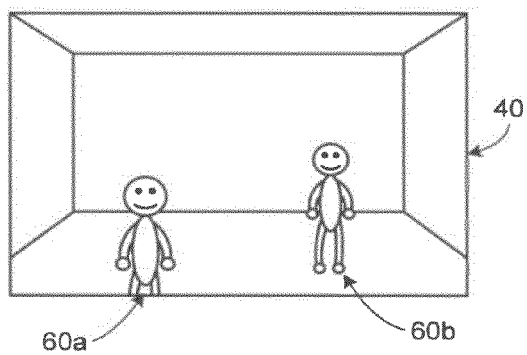
FIG. 29A is a diagram illustrating still another example of the range-finding object used to describe the operation of the range finding device according to the embodiment.
Figure 29B:
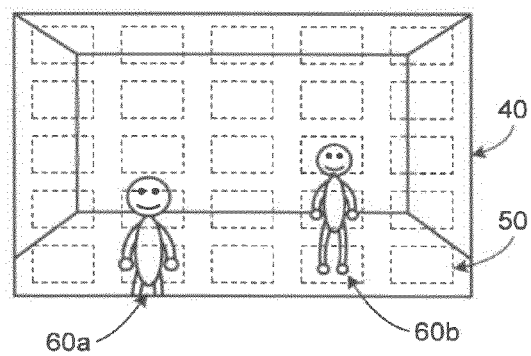
FIG. 29B is a diagram illustrating still another example of the correlation between the range-finding object and the range-finding area according to the embodiment.

FIGS. 29A and 29B illustrate an example in which there is a plurality of range-finding objects 60a and 60b in an indoor environment. In FIG. 29A, the range-finding objects 60a and 60b are present on the left side and right side away from the center of the image capturing area 40. FIG. 29B illustrates a state in which the range-finding areas 50 is superposed onto FIG. 29A.

Figure 30:
FIG. 30 is a diagram illustrating still another example of range finding results for respective range-finding areas obtained with the range finding device according to the embodiment.

An example of the distance data of the range-finding areas in the state of FIGS. 29A and 29B is illustrated in FIG. 30. A process for generating the distance distribution data for each of the columns and rows of the range-finding areas 50 is the distance distribution generating process (11-3). As an example of the distance distribution generating process (11-3), a process that generates a graph indicating the displacement of the distance data according to the position of the range-finding area 50 is used. FIGS. 31A and 31B illustrate an example of graphs indicating the distance distribution data generated by the distance distribution generating process (11-3). In each of the graphs illustrated in FIGS. 31A and 31B, the vertical axis indicates the reciprocal of the distance data and the horizontal axis indicates the position of the range-finding area 50.

FIG. 31A is a graph illustrating the distance distribution data for columns (A to E), in which the horizontal axis indicates the position of rows (a to e) of the range-finding areas 50. FIG. 31B is a graph illustrating the distance distribution data for the rows (a to e), in which the horizontal axis indicates the position of the columns (A to E) of the range-finding areas 50. As illustrated in FIGS. 31A and 31B, in the indoor environment illustrated in FIGS. 29A and 29B in which two range-finding objects (objects 60*a* and 60*b*) are dispersed in the image capturing area 40, a variation in the range finding data is large in the columns B and D of the range-finding areas 50 and a variation in the distance data is large in the rows c to e of the range-finding areas 50 of.

Returning to FIG. 11, on the basis of the distance distribution data generated by the distance distribution generating process (11-3), an object position selecting process that selects the positions of the range-finding objects 60*a* and 60*b* in the range-finding areas 50 is performed (11-4). The object position selecting process (11-4) will be described in detail with reference to the flowchart illustrated in FIG. 12. First, the gradients of the distance data are calculated on the basis of the distance distribution data, generated by the distance distribution generating process (11-3), for each of the range-finding areas 50. An area selecting process (12-1) that selects the range-finding area 50 in which the object is present is performed on the basis of the gradients. The area selecting process will be described in detail with reference to the flowchart illustrated in FIG. 13.

Figure 32A:
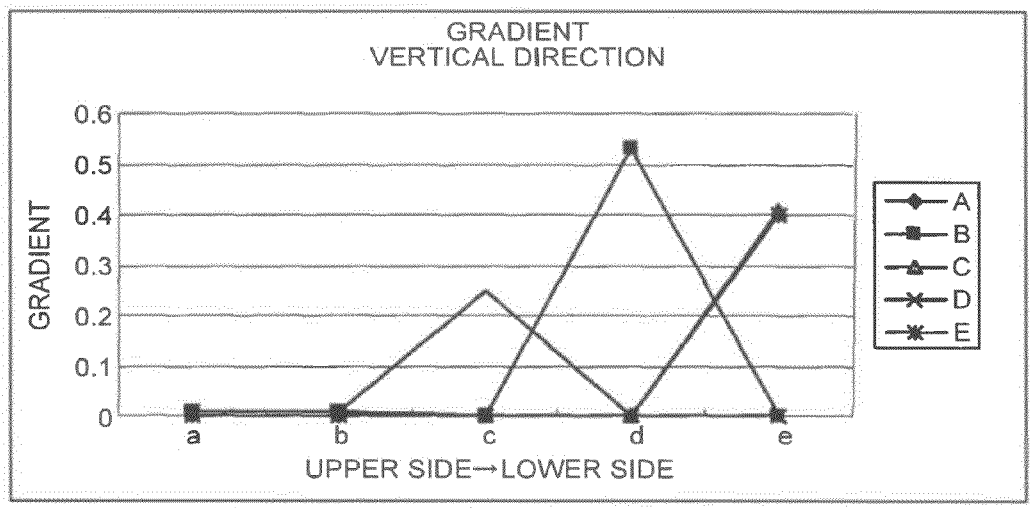
FIG. 32A is a graph illustrating still another example of the distribution of the gradients of the range finding data in the columns based on the range finding result.

First, a process (13-1) for calculating the gradients of the distance data is performed. The gradients calculated by the gradient detecting process (13-1) are plotted to obtain the graphs illustrated in FIGS. 32A and 32B. Then, an area searching process that searches for the positions of the range-finding areas 50 in which the objects 60*a* and 60*b* are present is performed based on the calculated gradients (13-2). The first point indicating a rapid change in the gradient (gradient in the row direction) of the range-finding areas 50 in the columns is extracted. For example, as illustrated in FIG. 32A, the gradient of the column B rapidly changes at the position of the row d and the gradient of the column D rapidly changes at the position of the row c. Therefore, the columns B and D are extracted.

Figure 32B:
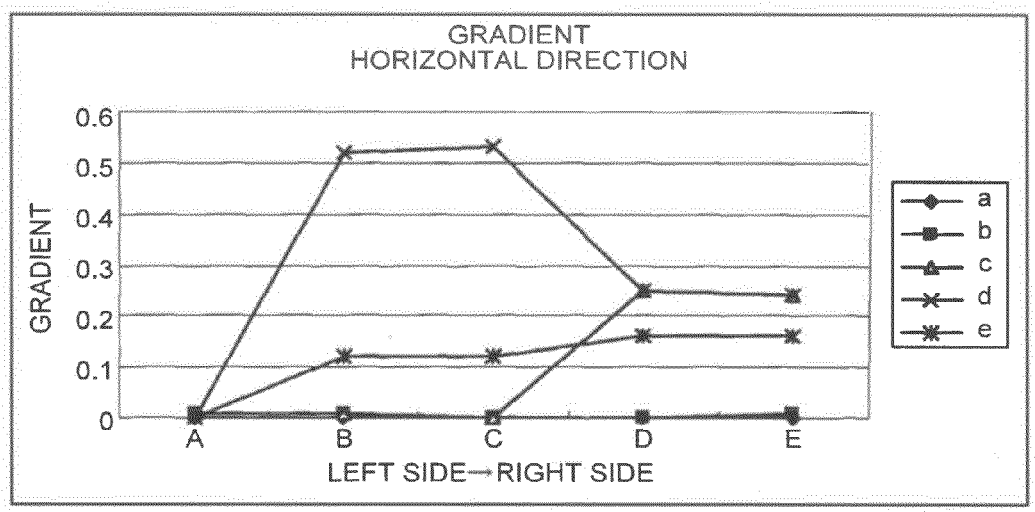
FIG. 32B is a graph illustrating still another example of the distribution of the gradients of the range finding data in the rows based on the range finding result.

As illustrated in FIG. 32B, the gradient of the row b rapidly changes at the position of the column B and the gradient of the row c rapidly changes at the position of the column D. Therefore, the rows b and c are extracted.

Figure 15:
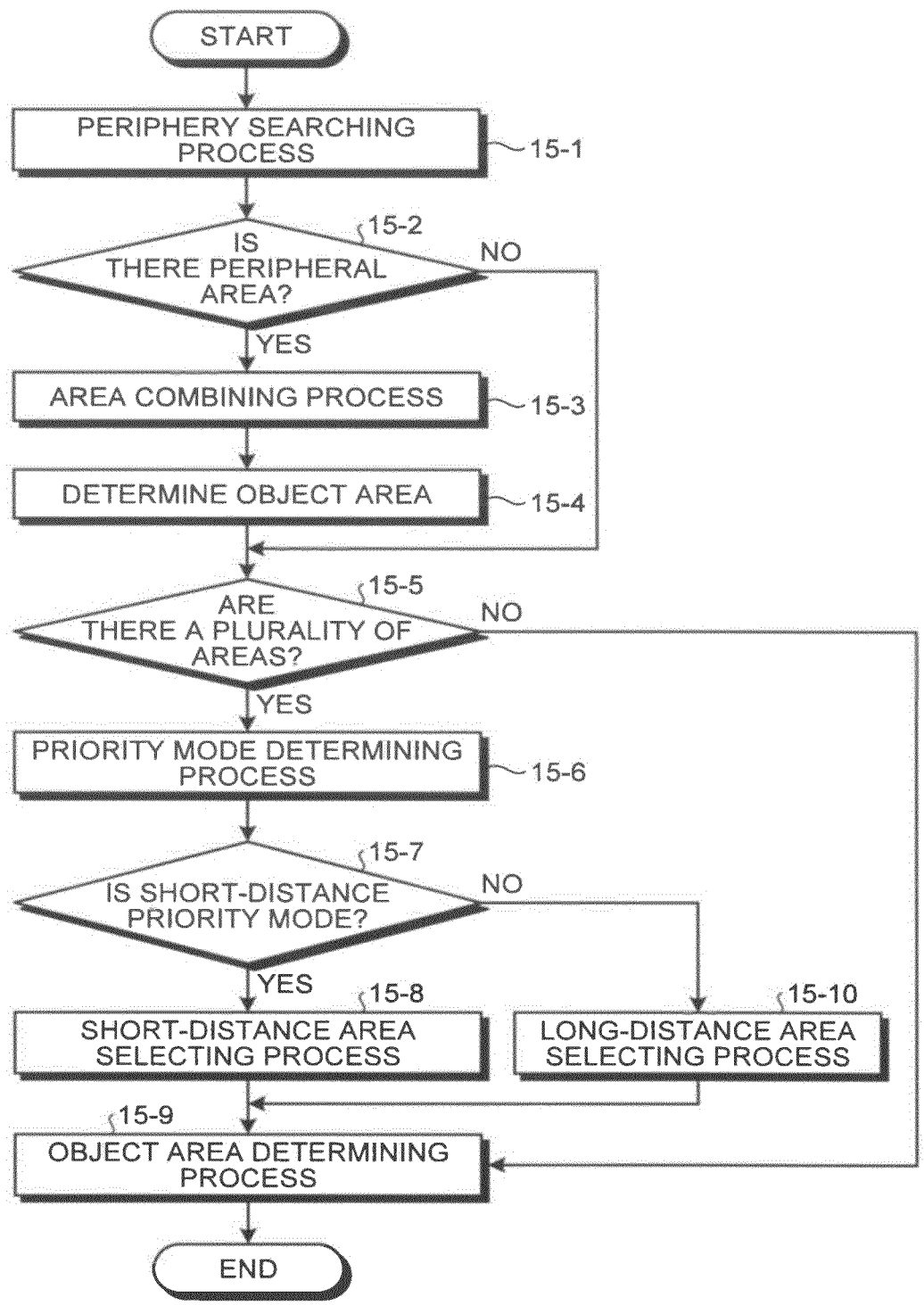
FIG. 15 is a flowchart illustrating another example of the area determining process related to the object area selecting process.

Returning to FIG. 13, when the candidate area is specified in the area searching process (13-2) (YES in 13-3), an area determining process (13-4) is performed. The area determining process (13-4) will be described with reference to the flowchart illustrated in FIG. 15. In FIG. 15, first, the area determining process (13-4) performs a process to search for the periphery of the candidate area (the range-finding area 50Cc in FIG. 30) (15-1).

Figure 33A:
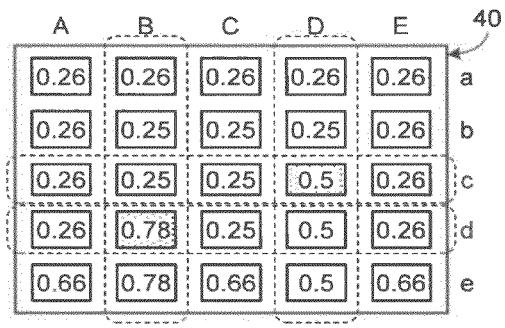
FIG. 33A is a diagram illustrating still another example of the candidate area extracted on the basis of the distribution of the gradients.

In FIG. 33A, the distance data of the range-finding area 50Bd, that is one of the specified candidate areas, is "0.78" and the distance data of the range-finding area 50Dc is "0.5". In the periphery searching process (15-1), the range-finding area 50 with distance data of "0.78" is extracted from the range-finding areas 50 disposed around the range-finding area 50Bd. In addition, the range-finding area 50 with distance data of "0.5" is extracted from the range-finding areas 50 disposed around the range-finding areas 50Dc.

Figure 33B:
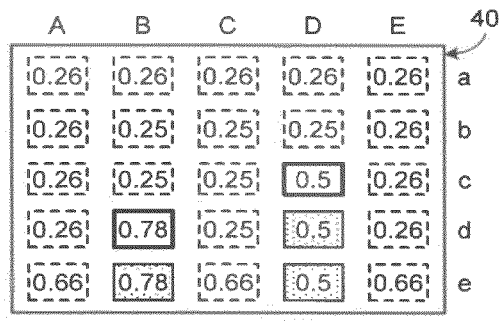
FIG. 33B is a diagram illustrating still another example of the candidate area and the peripheral areas extracted on the basis of the distribution of the gradients.

As illustrated in FIG. 33B, the range-finding area 50Be corresponds to the peripheral area of the range-finding area 50Bd. In addition, the range-finding areas 50Dd and 50De correspond to the peripheral areas of the range-finding area 50Dc. When the peripheral areas are specified in the periphery searching process (15-1), the range-finding area with the same distance data as that of the candidate area is used as the peripheral area, but the embodiment is not limited thereto. The range-finding area with a value approximate to the distance data of the candidate area may be specified as the peripheral area. The range of the approximate value may be set in advance.

In the periphery searching process (15-1), in addition to an adjacent range-finding area 50 having the same distance data as that of the candidate area, the range-finding area 50 with an approximate value for the distance close to the distance of the candidate area may be specified as the peripheral area. In this case, the range of the approximate value may be set in advance and stored in the ROM (185).

Returning to FIG. 15, when the peripheral areas are specified by the periphery searching process (15-1) (YES in 15-2), an area combining process (15-3) is performed such that the specified peripheral areas are specified as the range-finding areas 50 in which the object is present. The range-finding area 50Be, which is the peripheral area of the range-finding area 50Bd, is stored as the area in which the object 60*a* is present in the storage unit (not illustrated) by the area combining process. In addition, the range-finding area 50Dd and the range-finding area 50De, which are the peripheral areas of the range-finding area 50Dc, are stored as the areas in which the object 60*b* is present in the storage unit (not illustrated).

In the periphery searching process (15-1), when a peripheral area is specified (YES in 15-2), the area combining process (15-3) is performed such that the specified peripheral area is specified as the range-finding area 50 in which an object is present, thereby determining an object area (15-4). In the periphery searching process (15-1), when no peripheral area is specified (NO in 15-2), it is determined that the object is present only in a candidate area, and the object area is determined (15-4).

Figure 34A:
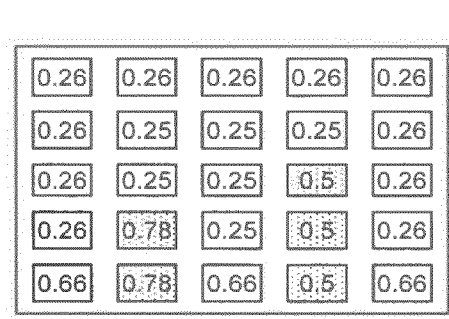
FIG. 34A is a diagram illustrating still another example of the correlation between the range-finding areas and the object areas determined according to the range-finding object.
Figure 34B:
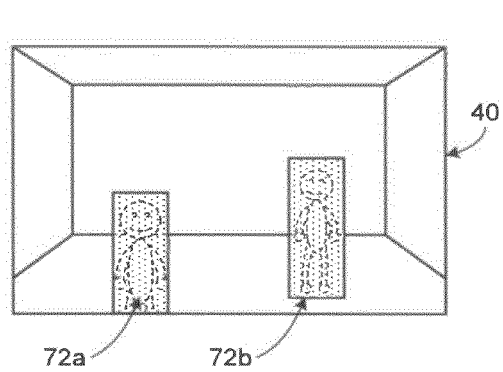
FIG. 34B is a diagram illustrating still another example of the correlation between the range-finding objects and the object areas.

The range-finding area 50, which is a combination of the range-finding area 50Bd that is determined to be the candidate area and the range-finding area 50Be that is specified as the peripheral area thereof, the range-finding area 50, which is a combination of the range-finding area 50Dc that is a candidate area, the range-finding areas 50Dd and 50De that are the peripheral areas thereof, and the range-finding area 50Ce, are determined to be object areas 72*a* and 72*b* (15-4). Examples of the object areas 72*a* and 72*b* are illustrated in FIG. 34B.

Figure 35A:
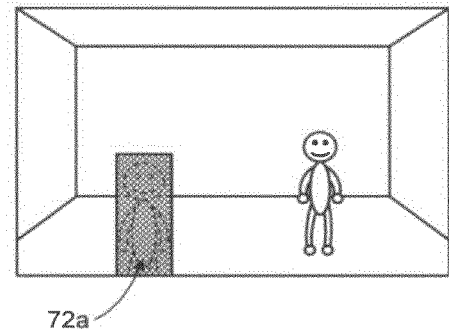
FIG. 35A is a diagram illustrating an example of the range-finding object in the object area determined according to the range-finding object in a near side priority mode.
Figure 35B:
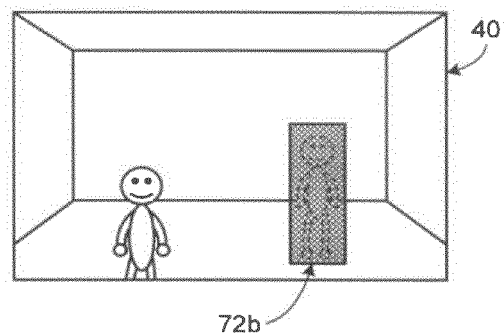
FIG. 35B is a diagram illustrating an example of the range-finding object in the object area determined according to the range-finding object in a far side priority mode.

Then, when there is a plurality of candidate areas in the area searching process (YES in 15-5), a priority mode determining process (15-6) is performed. The priority mode determining process determines whether the priority mode is a "short-distance priority mode" or a "long-distance priority mode" on the basis of the signal received from the external I/F block (183-4). The "short-distance priority mode" is a default mode. When the priority mode is the short-distance priority mode (YES in 15-7), a short-distance area is selected from a plurality of candidate areas (15-8). If not (NO in 15-7), a long-distance area is selected (15-10). In this way, the object area is determined (15-9). FIG. 35A illustrates the object area 72a selected in the "short-distance priority mode". FIG. 35B illustrates the object area 72b selected in the "long-distance priority mode".

When a plurality of candidate areas is not present (NO in 15-5), the priority mode does not need to be selected, and the object area 72b selected in the long-distance priority mode is determined to be the object area (15-9).

Returning to FIG. 13, the area determined in the area determining process (13-4) is determined as the object area (13-5). When there is no candidate area in the area searching process (13-2) (NO in 13-3), a planar object determining process (13-6) for determining whether the object is a planar object is performed. The planar object determining process is the same as that described in the first embodiment and thus a description thereof will not be repeated.

Returning to FIG. 12, in the area selecting process (12-2), when the object area is determined, the range finding result from the object area is set (12-5). If not, it is determined that range finding is impracticable and an NG distance position is set (12-6). In the object distance setting process (12-5), when there is a combined area or a planar area, the average value of the range finding results of the plurality of areas is set as an object distance. An infinity position is set for the NG distance position.

When the range finding device is provided in a digital camera, the object distance may be set to the hyperfocal distance of the digital camera.

After the object distance setting process (12-5) or the object distance setting impracticable process (12-6) is performed, the range finding process (9-2) illustrated in FIG. 9 ends. The above-mentioned processes are repeatedly performed while the range finding device 1 is operating. In this way, the range finding process suitable for the environment of the object can be performed constantly. In the second embodiment, when there is a plurality of areas, the "short-distance priority mode" or the "long-distance priority mode" can be selected from outside to select the range-finding area. In this way, the range finding result that a user has intended can be output.

Third Embodiment

A range finding device according to still another embodiment (a third embodiment) will be described below. The third embodiment relates to another example of the process that is performed when there is a plurality of objects in the image capturing area 40. Various kinds of operations of a range finding device 1 according to the third embodiment is performed by respective control programs stored in the ROM 185 (see FIG. 2), similarly to the range finding device according to the first embodiment.

FIG. 9 is a flowchart illustrating an example of a flow of a range finding method performed in the range finding device 1 according to the third embodiment. As illustrated in the flowchart of FIG. 9, the range finding device 1 according to the third embodiment performs a photometric process (9-1) and then performs a range finding process (9-2) using an exposure setting that corresponds to the result of the photometric process. The "range finding method" performed by the range finding device 1 according to the third embodiment includes the photometric process (9-1) and the range finding process (9-2) illustrated in FIG. 9.

The photometric process (9-1) will be described below with reference to the flowchart illustrated in FIG. 10. First, a photometric calculation process is performed to convert an image signal that is output according to images of a range-finding object formed on the first light receiving surface 16a and the second light receiving surface 16b of the image capturing element 15 through an optical system into YUV signals using a CCD signal processing block 184-1 and calculates an exposure evaluation value on the basis of the YUV image signals (10-1). Then, an exposure amount setting process is performed to detect the Y value (brightness) of the range-finding object on the basis of the calculated evaluation value and to set an appropriate amount of exposure (the shutter speed of an electronic shutter) (10-2). Then, a TG setting process for setting the TG of the image capturing element 15 is performed on the basis of the set amount of exposure (10-3).

Returning to FIG. 9, as described above, a process for exposing the image capturing element 15 is performed on the basis of the amount of exposure set in the exposure amount setting process (10-2) to acquire an image signal and the range finding process (9-2) is performed. The range finding process (9-2) will be described below with reference to the flowchart illustrated in FIG. 11. First, a VD signal standby process is performed so as to acquire the exposure timing of two image capturing elements 15 that are sensors for range finding (11-1). Then, a range-finding calculating process is performed for each range-finding area 50 on the basis of the image signal obtained by converting the exposed image signal into YUV signals using the CCD signal processing block 184-1 (11-2). The distance data of each range-finding area 50 is calculated by the range-finding calculation process (11-2).

A distance distribution generating process that calculates the distribution of distance data for each vertical line of the range-finding areas 50 and each horizontal line of the range-finding areas 50 is performed using the distance data of each range-finding area 50 calculated by the range-finding calculation process (11-2) (11-3).

Figure 36A:
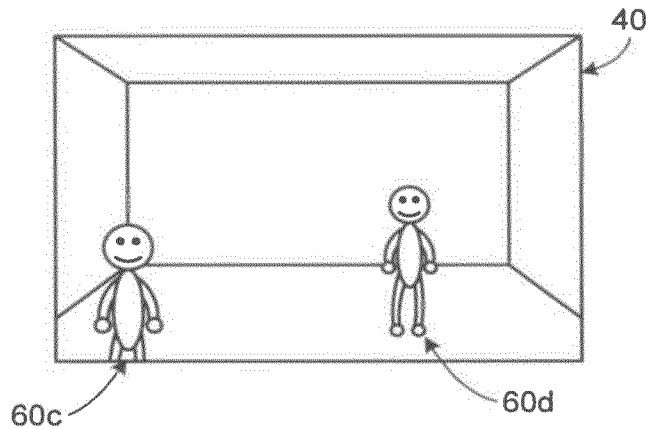
FIG. 36A is a diagram illustrating yet another example of the range-finding object used to describe the operation of the range finding device according to the embodiment.
Figure 36B:
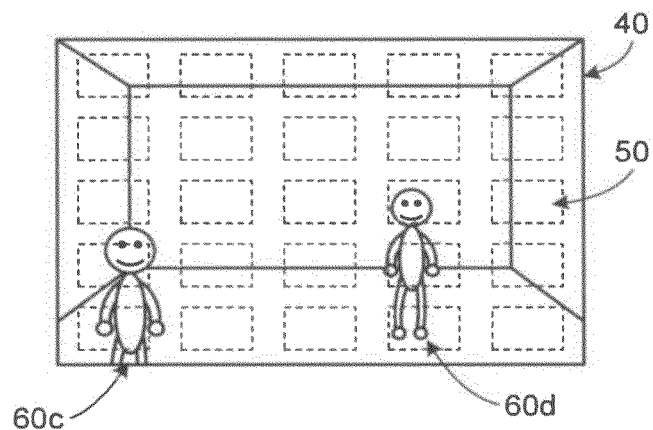
FIG. 36B is a diagram illustrating yet another example of the correlation between the range-finding object and the range-finding area according to the embodiment.
Figure 36C:
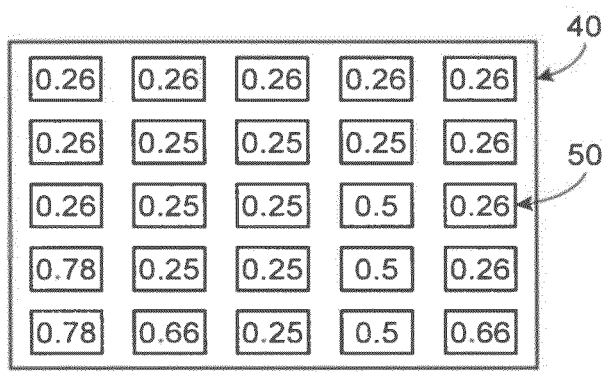
FIG. 36C is a diagram illustrating yet another example of the range finding results for respective range-finding areas according to the embodiment.

FIGS. 36A to 36C illustrate an example in which there is a plurality of range-finding objects 60c and 60d in an indoor environment and one of the objects extends beyond the border of the image capturing area 40 (an image of the object is truncated). In FIG. 36A, the range-finding object 60c, which is one of the candidates of the range-finding objects, is disposed near the border of the image capturing area 40 and the object 60d is disposed near, but to the right from, the center of the image capturing area 40. FIG. 36B illustrates a state in which the range-finding areas 50 are superposed onto FIG. 36A.

An example of the distance data of each range-finding area in the state of FIG. 36A is illustrated in FIG. 36B. A process for generating the distance distribution data for each of the columns and rows of the range-finding areas 50 is the distance distribution generating process (11-3). As an example of the distance distribution generating process (11-3), a process for generating a graph that indicates the displacement of the distance data according to the positions of the range-finding areas 50 is used. FIGS. 37A and 37B illustrate an example of the graphs indicating the distance distribution data generated by the distance distribution generating process (11-3).

FIG. 37A is a graph illustrating the distance distribution data for columns (A to E), in which the horizontal axis indicates the positions of rows (a to e) of the range-finding areas 50. The left direction of the horizontal axis indicates the upper side of the image capturing area 40 and the right direction thereof indicates the lower side of the image capturing area 40. FIG. 37B is a graph illustrating the distance distribution data for the rows (a to e), in which the horizontal axis indicates the positions of the columns (A to E) of the range-finding areas 50. The left direction of the horizontal axis indicates the left side of the image capturing area 40 and the right direction thereof indicates the right side of the image capturing area 40. As illustrated in FIGS. 37A and 37B, in the indoor environment illustrated in FIGS. 36A to 36C in which two range-finding objects (the objects 60c and 60d) are dispersed in the image capturing area 40, a variation in the range finding data is large in the columns B and D of the range-finding areas 50 and a variation in the distance data is large in the rows c to e of the range-finding area 50.

Returning to FIG. 11, then, an object position selecting process that selects the positions of the range-finding objects 60c and 60d in the range-finding areas 50 is performed on the basis of the distance distribution data generated by the distance distribution generating process (11-3) (11-4). The object position selecting process (11-4) will be described in detail with reference to the flowchart illustrated in FIG. 12. First, the gradients of the distance data are calculated on the basis of the distance distribution data for each range-finding area 50 that is generated by the distance distribution generating process (11-3). An area selecting process (12-1) that selects the range-finding area 50 in which the object is present is performed on the basis of the gradients. The area selecting process will be described in detail with reference to the flowchart illustrated in FIG. 13.

Figure 38A:
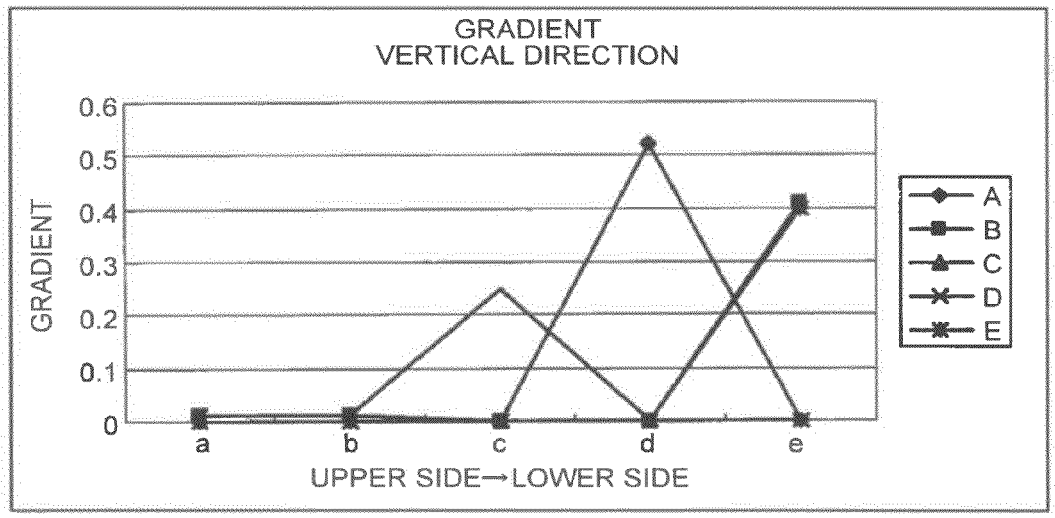
FIG. 38A is a graph illustrating yet another example of the distribution of the gradients of the range finding data in the columns based on the range finding results.

First, a gradient detecting process (13-1) that calculates the gradients is performed using the distance data calculated in the range-finding calculation process (11-2). The gradients calculated by the gradient detecting process (13-1) are plotted to obtain the graphs illustrated in FIGS. 38A and 38B. Then, an area searching process that searches for the positions of the range-finding areas 50 in which the objects 60c and 60d are present is performed from the calculated gradients (13-2). First, a first point indicating a rapid change in the gradient (gradient in the row direction) in the column of the range-finding areas 50 is extracted. For example, as illustrated in FIG. 38A, the gradient of the column A rapidly changes at the position of the row d and the gradient of the column D rapidly changes at the position of the row c. Therefore, the columns B and D are extracted.

Figure 38B:
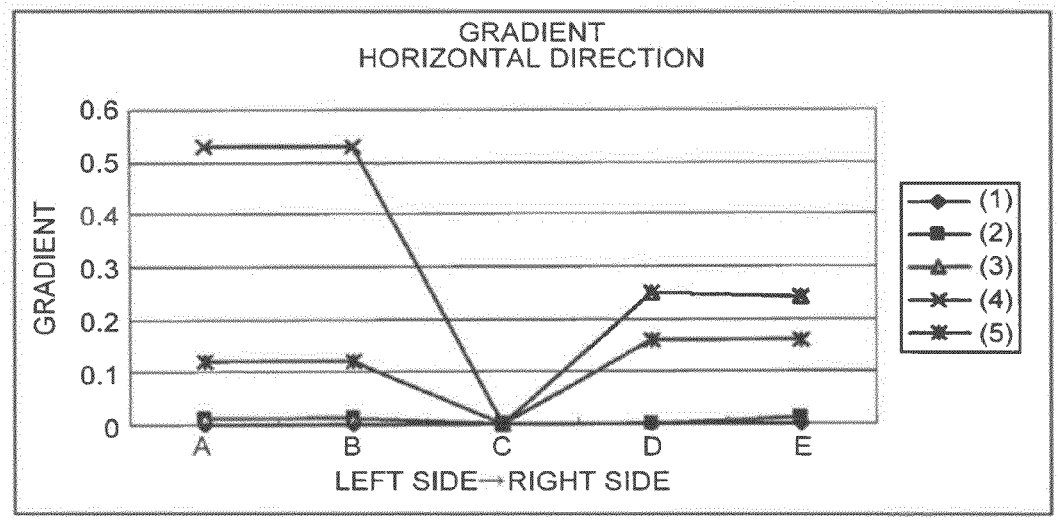
FIG. 38B is a graph illustrating yet another example of the distribution of the gradients of the range finding data in the rows based on the range finding results.

As illustrated in FIG. 38B, the gradient of the row c rapidly changes at the position of the column D, the gradient of the row d rapidly changes at the position of the columns A and D, and the gradient of the row e rapidly changes at the positions of the columns A and D. Therefore, the rows c, d, and e are extracted.

Figure 16:
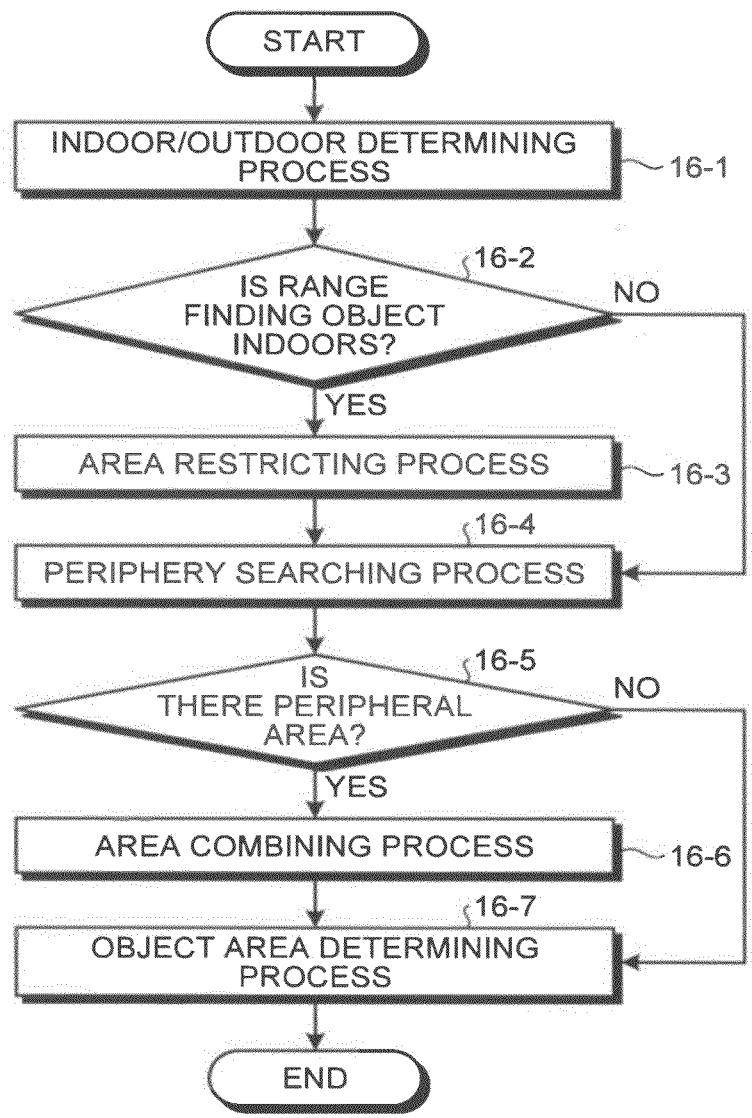
FIG. 16 is a flowchart illustrating still another example of the area determining process related to the object area selecting process.

Returning to FIG. 13, when the candidate area is specified in the area searching process (13-2) (YES in 13-3), an area determining process (13-4) is performed. The area determining process will be described with reference to the flowchart illustrated in FIG. 16.

Figure 17:
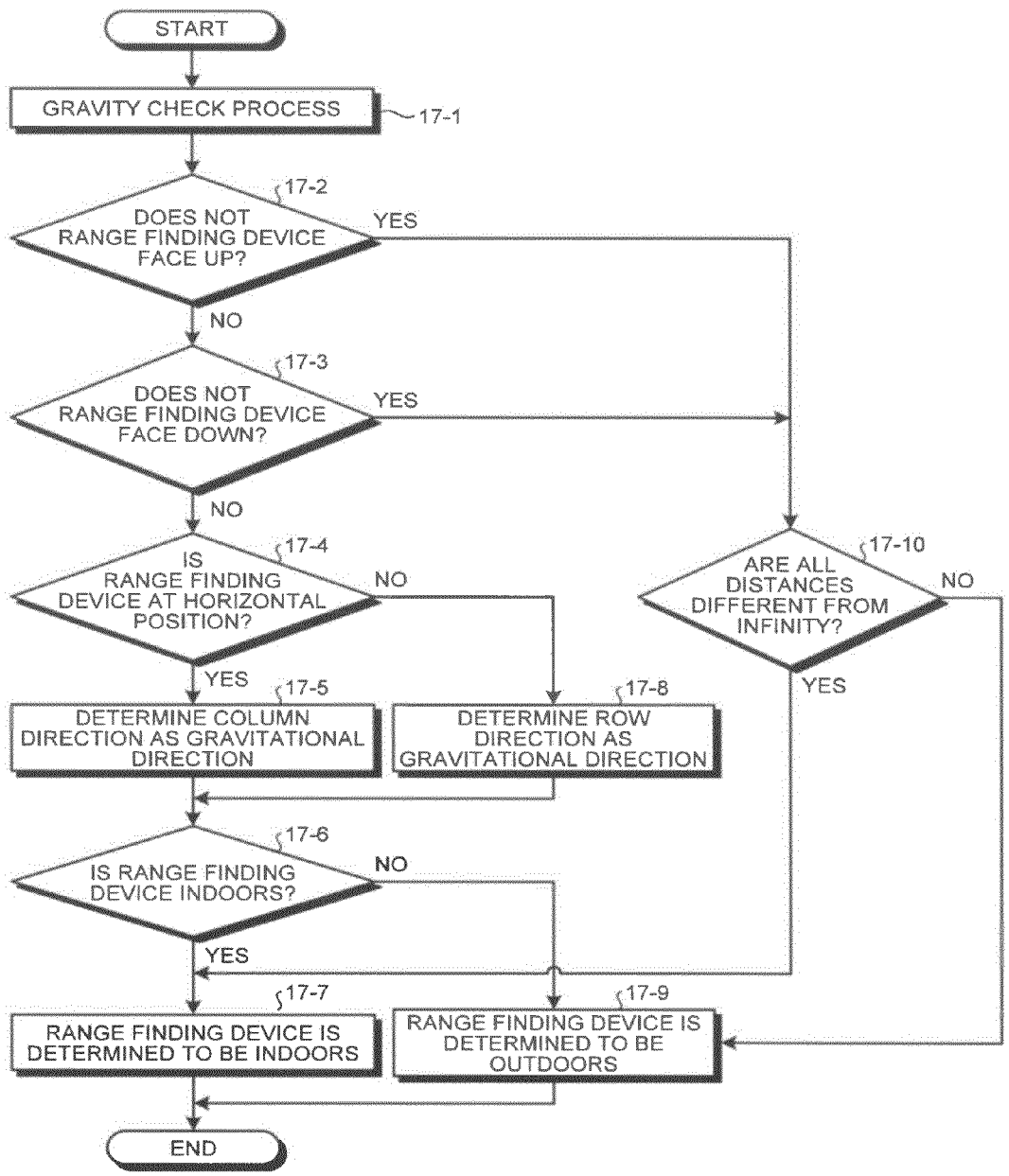
FIG. 17 is a flowchart illustrating an example of an indoor/outdoor determining process related to the area determining process.

First, an indoor/outdoor determining process (16-1) is performed. The indoor/outdoor determining process (16-1) determines whether the range-finding object is indoors or outdoors. The indoor/outdoor determining process (16-1) will be described in detail with reference to the flowchart illustrated in FIG. 17. First, a gravity check process (17-1) is performed to acquire a roll angle and a pitch angle from the output of the acceleration sensor (186) so as to determine the gravitational direction of the range finding device 1.

Then, a process for determining the direction of the range finding device 1 is performed. First, a process for determining whether the range finding device 1 faces up is performed (17-2). A sentence that "the range finding device 1 faces up" means that the optical system of the range finding device 1 points to the direction opposite to the ground. That is, in a normal state of use, the range finding device 1 is arranged with the Y-Z plane (see FIG. 1) facing the ground. Therefore, when the range finding device 1 faces up, the X-Y plane thereof faces down to the ground. When the range finding device 1 does not face up (NO in 17-2), a process that determines whether the range finding device 1 faces down is performed (17-3). A sentence that "the range finding device 1 faces down" means that the optical system of the range finding device 1 faces down to the ground. When the range finding device 1 does not face down (NO in 17-3), a process for determining whether the range finding device 1 faces sideways is performed (17-4).

When it is determined that the range finding device 1 is at a horizontal position on the basis of the roll angle of the range finding device 1 acquired from the acceleration sensor (186) (YES in 17-4), it is determined that the column direction of the range-finding areas 50 is the gravitational direction (17-5), and the indoor/outdoor determining process is performed using the distance distribution data of the columns A to E. When it is determined that the range finding device 1 is at a vertical position on the basis of the roll angle of the range finding device 1 acquired from the acceleration sensor (186) (NO in 17-4), it is determined that the row direction of the range-finding areas 50 is the gravitational direction (17-8) and the indoor/outdoor determining process (17-6) is performed using the distance distribution data of the rows a to e.

Figure 42A:
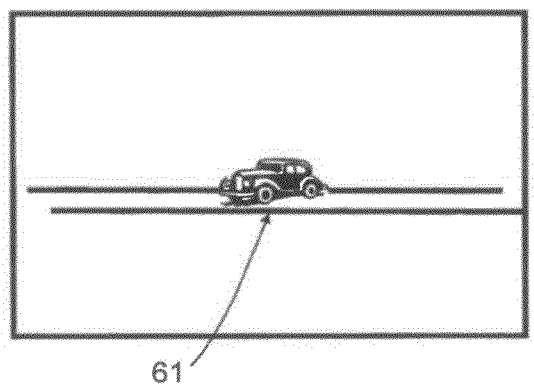
FIG. 42A is a diagram illustrating an example of the range-finding object used to describe an example of an indoor/outdoor determining process of the range finding process.
Figure 42B:
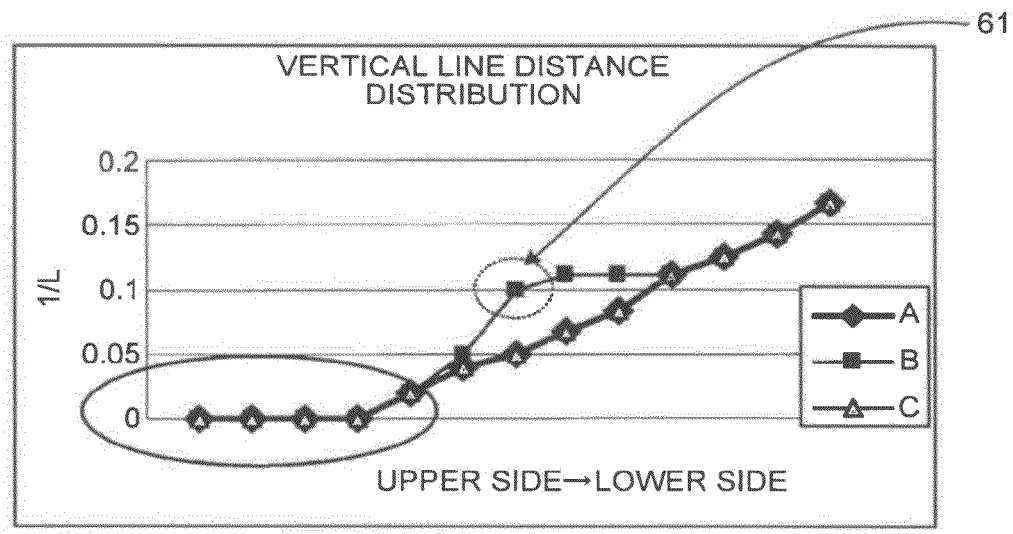
FIG. 42B is a diagram illustrating an example of the distribution of range finding data used to describe an example of an indoor/outdoor determining process of the range finding process.

A sentence that "the range finding device 1 is at the horizontal position" means that the first and second light receiving surfaces 16a and 16b are in the X-Y plane. A sentence that "the range finding device 1 is at the vertical position" means that the first and second light receiving surfaces 16a and 16b are in the X-Z plane. The indoor/outdoor determining process (17-6) will be described with reference to FIGS. 42A, 42B, 43A, and 43B. FIG. 42A is a diagram illustrating a state in which a range-finding object 61 is outdoors. FIG. 42B is a diagram illustrating a distance distribution for columns of the range-finding areas 50 in FIG. 42A. Three columns of range-finding areas 50 are set in the image capturing area 40. In addition, columns A, B, and C are arranged from left to right in the image capturing area 40. In FIG. 42B, the scale on the horizontal axis indicates rows of the range-finding areas 50 which are not illustrated in FIG. 42A. In the example illustrated in FIGS. 42A and 42B, there are 13 divided rows. As illustrated in FIG. 42B, the origin of the horizontal axis corresponds to the upper side of the image capturing area 40.

As can be seen from FIG. 42B, when the object 60 is outdoors, the distance data of the range-finding area 50 disposed on the upper side of the image capturing area 40 tends to zero. This is because the upper side of the image capturing area 40 is likely to be empty outdoors and the distance is hardly detected and becomes infinity.

Figure 43A:
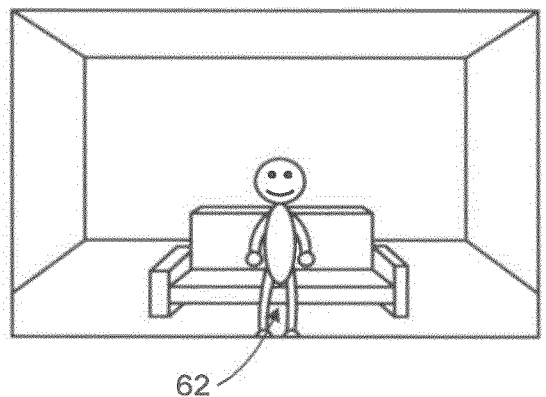
FIG. 43A is a diagram illustrating an example of the range-finding object used to describe another example of the indoor/outdoor determining process of the range finding process.
Figure 43B:
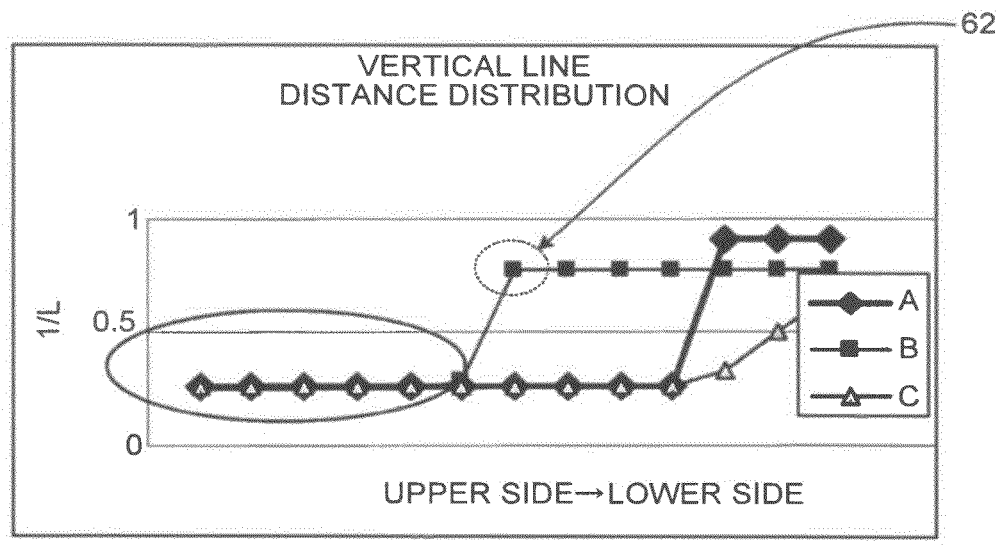
FIG. 43B is a diagram illustrating another example of the distribution of range finding data used to describe another example of the indoor/outdoor determining process.

FIG. 43A is a diagram illustrating a state in which the range-finding object 60 is indoors. FIG. 43B is a diagram illustrating a distance distribution for each column of the range-finding areas 50 in FIG. 43A. Three columns of the range-finding areas 50 are set in the image capturing area 40. In addition, columns A, B, and C are set from the left side to the right side of the image capturing area 40. In FIG. 43B, graduations on the horizontal axis indicate the rows of the range-finding areas 50 which are not illustrated in FIG. 43A. In the example illustrated in FIGS. 43A and 43B, there are 13 divided rows. As illustrated in FIG. 43B, the origin of the horizontal axis is the upper side of the image capturing area 40.

As can be seen from FIG. 43B, when an object 62 is indoors, the distance data of the range-finding area 50 disposed on the upper side of the image capturing area 40 is not zero and tends to have a predetermined value. In the indoor environment, for example, the ceiling or the wall is on the upper side of the image capturing area 40 and a predetermined distance is measured. Therefore, the distance data of the range-finding area 50 disposed on the upper side of the image capturing area 40 is not zero.

As such, the indoor/outdoor determining process (17-6) determines whether the distance data of the range-finding area 50 disposed opposite to the gravitational direction which is determined on the basis of the output of the acceleration sensor (186) is zero, thereby determining whether the range finding device 1 is indoors or outdoors. When it is determined that the range finding device 1 is indoors (YES in 17-6), an indoor determining process (17-7) is performed. When it is determined that the range finding device 1 is outdoors, an outdoor determining process (17-9) is performed.

When the range finding device 1 faces up (YES in 17-2) and when the range finding device 1 faces down (YES in 17-3), it is difficult to determine the gravitational direction. Therefore, it is determined whether all distances output from the range-finding area 50 are different from infinity (17-10). When it is determined that all the distances are different from infinity (YES in 17-10), it is determined that the range finding device 1 is indoors (17-7) and the process proceeds to the indoor determining process (17-7). When it is determined that at least one of the distances is infinity (NO in 17-10), it is determined that the range finding device 1 is outdoors (17-9).

Returning to FIG. 16, in the indoor/outdoor determining process (16-1), when it is determined that the range-finding object is indoors (YES in 16-2), an area restricting process (16-3) is performed. The area restricting process (16-3) restricts the searching range of a candidate area. In particular, in the indoor environment, when there is a plurality of range-finding objects as illustrated in FIGS. 36A to 36C, the range-finding objects may be disposed on the near side, on the far side, or in a mixed state of the near and far sides in which a range-finding object is disposed on the near side and another range-finding object is disposed on the far side. In the "mixed state of the near and far sides", when the candidate areas are searched on the basis of the gradients of the distance data as in the first embodiment, for example, the range-finding area 50 in which a "truncated object", such as the range-finding object 60c illustrated in FIG. 36A is present, is used as the candidate area.

As such, in the indoor environment, there are range-finding objects disposed on the near and far sides in the image capturing area 40. Therefore, when the near side priority mode or the far side priority mode is simply selected, it is difficult to set a desired range-finding object (range-finding object 60d in FIG. 36A) and an error may occur in the setting of the object area. FIG. 39B illustrates an example of the restricted area. In FIG. 39B, a restricted area 500 is restricted in which the range-finding area 50 in the vicinity of the center of the image capturing area 40 is used as the candidate area.

As illustrated in FIG. 40A, only a range-finding area 50Dc in the restricted area 500 is used as the candidate area. As such, when the restricted area 500 is set and the candidate area is determined by the gradients of the range finding data, it is possible to avoid the candidate area that includes a truncated object and measure the distance to a position that a user has intended.

Then, a process to search for the periphery of the candidate area is performed (16-4). The periphery searching process (16-4) extracts a peripheral range-finding area 50 that has the same distance data as that of the candidate area in a case when the object 60d is not within the range of one range-finding area 50, but is likely to be laid across a plurality of range-finding areas 50. In the example illustrated in FIG. 36A, when the periphery searching process (16-4) is performed, the range-finding area 50Dd illustrated in FIG. 36A becomes the peripheral area. In the periphery searching process (16-4), in addition to an adjacent range-finding area 50 having the same distance data as that of the candidate area, the range-finding area 50 with an approximate value for the distance close to the distance of the candidate area may be specified as the peripheral area. In this case, the range of the approximate value may be set in advance and stored in the ROM (185).

When the peripheral areas are extracted by the periphery searching process (16-2) (YES in 16-5), an area combining process (16-6) is performed using the extracted (specified) peripheral areas (the range-finding areas 50Dc and 50Dd) as the range-finding areas 50 in which the object 60d is present. The area combining process (16-6) stores, in a storage unit (not illustrated), the range-finding area 50Dc, which is the candidate area, and the range-finding area 50Dd, which is the peripheral area, as an area in which the object 60d is present. In the periphery searching process (16-4), when no peripheral area is specified (NO in 16-5), only the candidate area (range-finding area 50Dc) is stored as the area in which the object 60d is present in the storage unit (not illustrated). After the object area is determined at an object area determining process (16-7), the process flow ends.

Returning to FIG. 13, after the area determining process (13-4), an object area determining process is performed (13-5). The object area determining process (13-5) sets an object area on the basis of the result of the area determining process (13-4). Specifically, the range-finding area 50Dc that is determined to be the candidate area and the range-finding area 50Dd that is specified as the peripheral area are determined to be an object area 73 (13-5). The object area is used during an AF process in the image capturing process that is performed after the range finding process. An example of the object area 73 is illustrated in FIG. 41.

In the area searching process (13-2), when there is no candidate area (NO in 13-3), a planar object determining process (13-6) for determining whether the object is a planar object is performed. The planar object determining process (13-6) is the same as that described in the first embodiment and thus a description thereof will not be repeated.

FIG. 25A illustrates an indoor environment that includes a planar object (in particular, an environment in which there is no object or person). The distance distribution and the gradients in this case are illustrated in FIGS. 26A to 27B. As can be seen from FIGS. 26A to 27B, the gradients have substantially the same tendency in the vertical line. In this case, there is a high possibility that the object is planar. In the planar object determining process (13-6), the object is determined to be a planar object. When the object is determined to be a planar object in the planar object determining process (13-6) (YES in 13-7), a planar area as illustrated in FIGS. 28A and 28B is determined. If not (NO in 13-7), it is determined that area determination is impracticable (13-9).

Returning to FIG. 12, in the area selecting process (12-1), when the object area 70 or 71 is determined (YES in 12-4), a distance setting process is performed from the range finding data of the range-finding area 50 corresponding to the object area 70 or 71 (12-5). In the distance setting process (12-5), when there is a combined area or a planar area, an average value of the range finding results of the plurality of areas is set as an object distance. In the area determining process (12-2), when no area is determined, a distance setting impracticable process (12-6) is performed. In the distance setting impracticable process (12-6), infinity is set as the position of an object.

When the range finding device 1 is applied to an image capturing device, such as a digital camera, the position of the object may not be set to infinity, but may be set to the hyperfocal distance of the image capturing device.

In the distance setting process (12-5), when there is a combined area or a planar area, the average value of the range finding results of the plurality of areas is set as an object distance and an NG distance position is set to, for example, 2.5 m. When the range finding device is provided in a digital camera, the distance may be set to the hyperfocal distance of the digital camera. Finally, the process returns to the flowcharts illustrated in FIGS. 11 and 9 and then ends. Because this operation is performed while the range finding device is operated, the environment and distance of the object can be output constantly.

As in the third embodiment, when it is determined whether the range finding device is indoors or outdoors to restrict the range-finding area, it is possible to remove a truncated object from the candidate area and thus output the range finding result as the user has intended.

Figure 44:
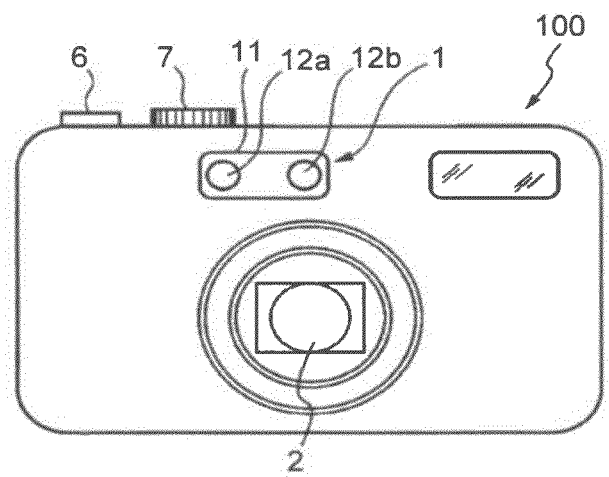
FIG. 44 is a front view illustrating an example of an external appearance of an image capturing device that includes the range finding device according to the embodiment.

Next, an image capturing device that includes the range finding device according to an embodiment will be described with reference to the drawings. FIG. 44 is a front view illustrating a digital camera, which is an example of the image capturing device that includes the range finding device according to the embodiment. As illustrated in FIG. 44, for example, an image capturing lens 2 having an optical zoom function and the lens array 11 that is provided on a front surface of the range finding device 1 are arranged on a front surface of a digital camera 100 according to the third embodiment. A pair of (two) range finding lenses 12a and 12b is integrally formed on the surface of the lens array 11 at a predetermined interval in the horizontal direction. An optical axis of the image capturing lens 2 is parallel to each of the optical axes of the range finding lenses 12a and 12b.

Figure 45:
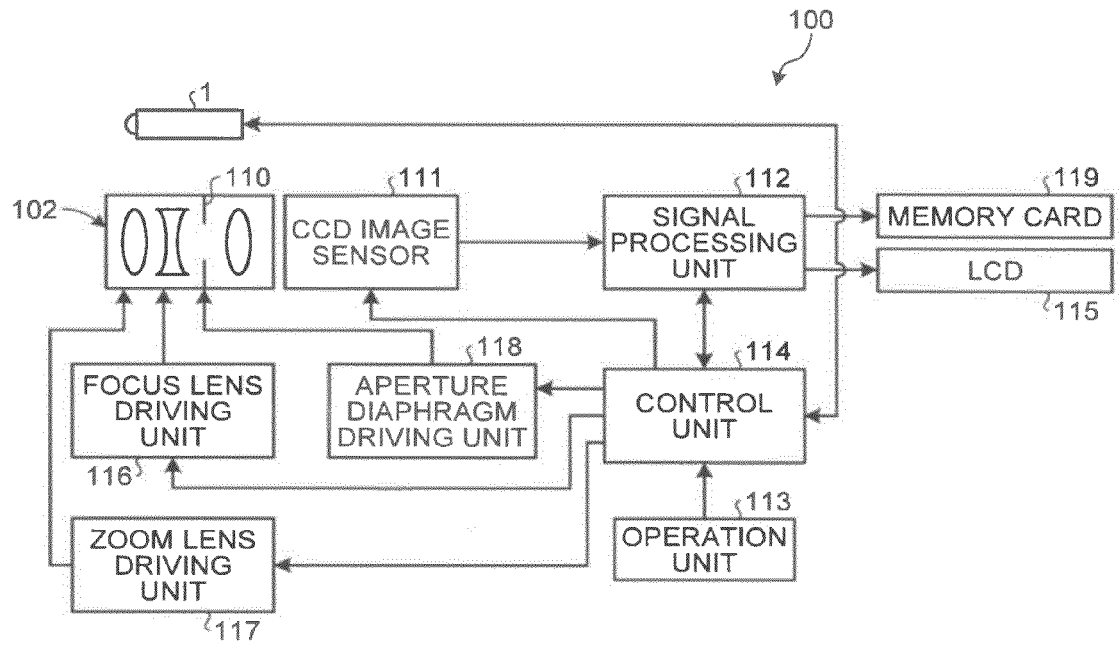
FIG. 45 is a functional block diagram illustrating an example of the image capturing device that includes the range finding device according to the embodiment.
Figure 46A:
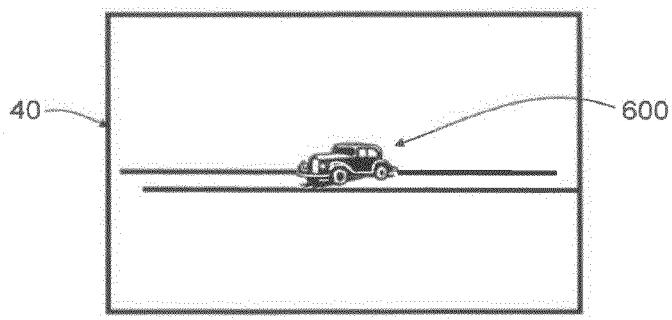
FIG. 46A is a diagram illustrating an example of a range-finding object used to describe a problem of a range finding method according to the related art.
Figure 46B:
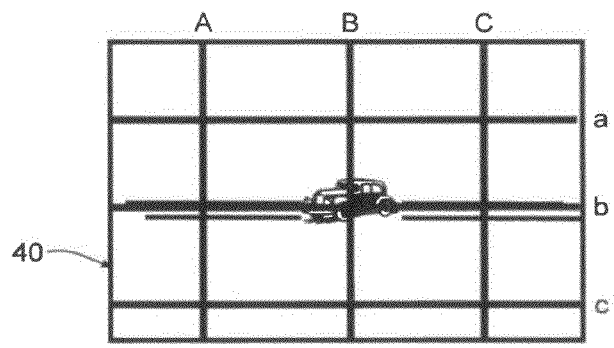
FIG. 46B is a diagram illustrating an example of an image capturing area in the description of the problem of the range finding method according to the related art.
Figure 47A:
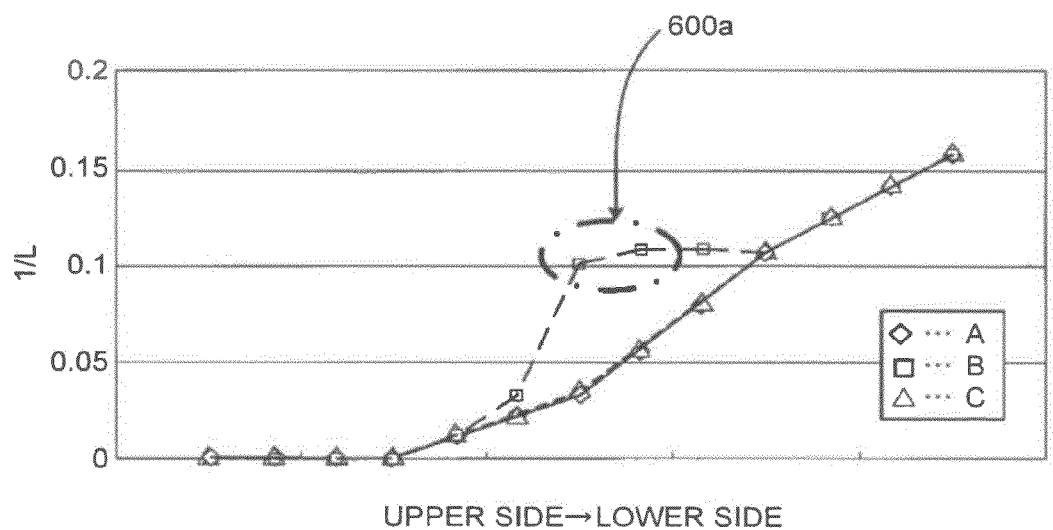
FIG. 47A is a graph illustrating an example of the distance distribution along vertical lines in the range finding result obtained by the range finding method according to the related art.
Figure 47B:
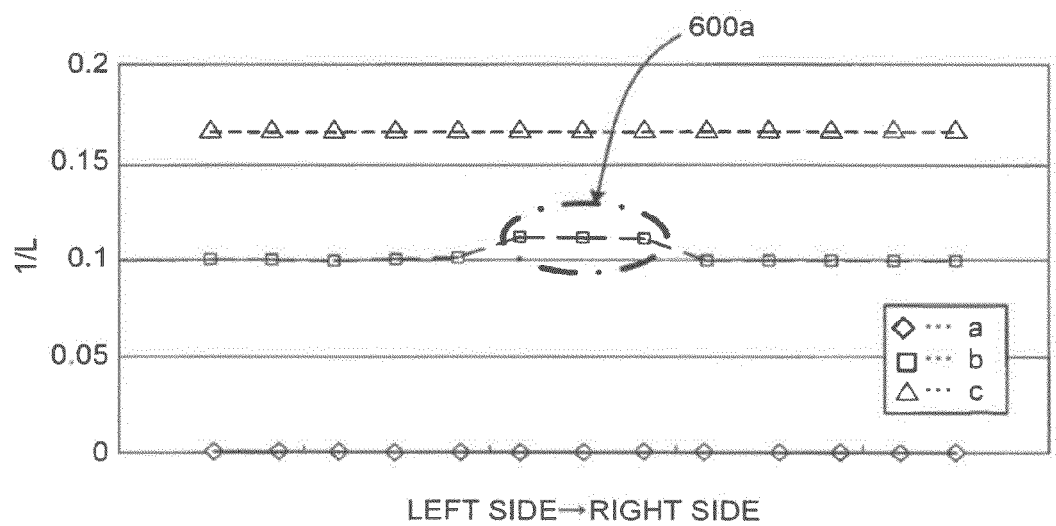
FIG. 47B is a graph illustrating an example of the distance distribution along horizontal lines in the range finding result obtained by the range finding method according to the related art.
Figure 48A:
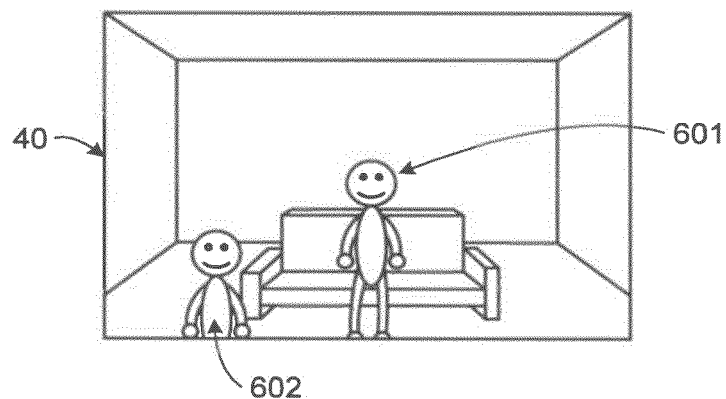
FIG. 48A is a diagram illustrating another example of the range-finding object used to describe the problem of the range finding method according to the related art.
Figure 48B:
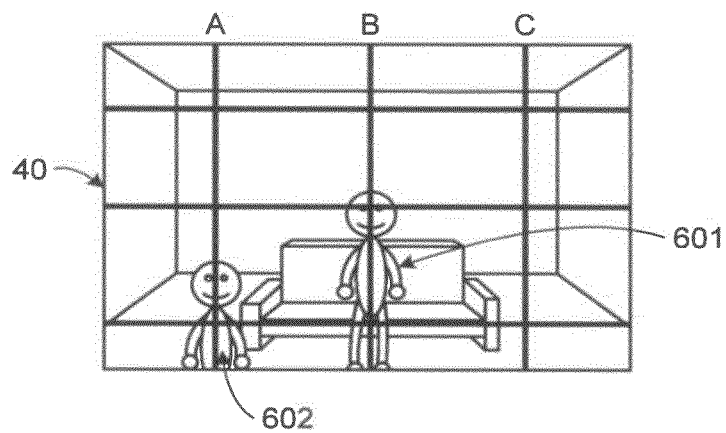
FIG. 48B is a diagram illustrating another example of the image capturing area in the description of the problem of the range finding method according to the related art.
Figure 49A:
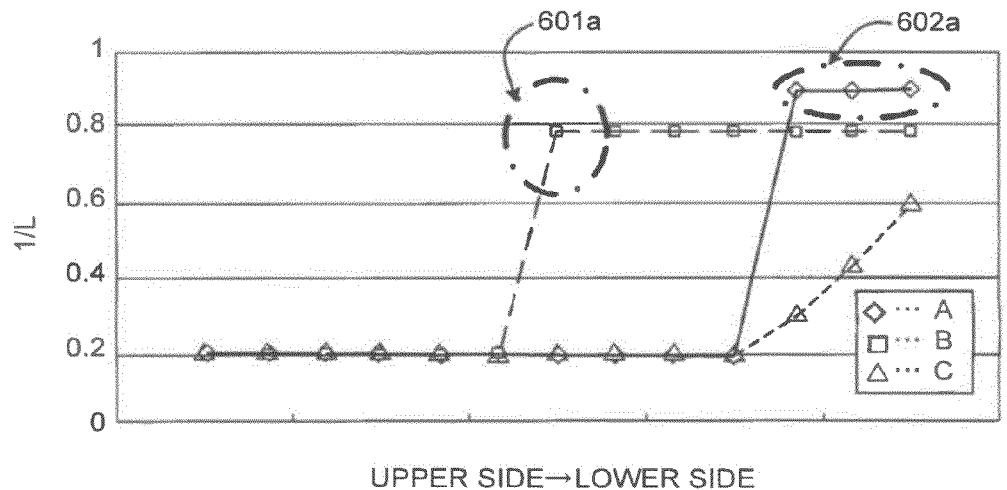
FIG. 49A is a graph illustrating another example of the distance distribution along vertical lines in the range finding result obtained by the range finding method according to the related art.
Figure 49B:
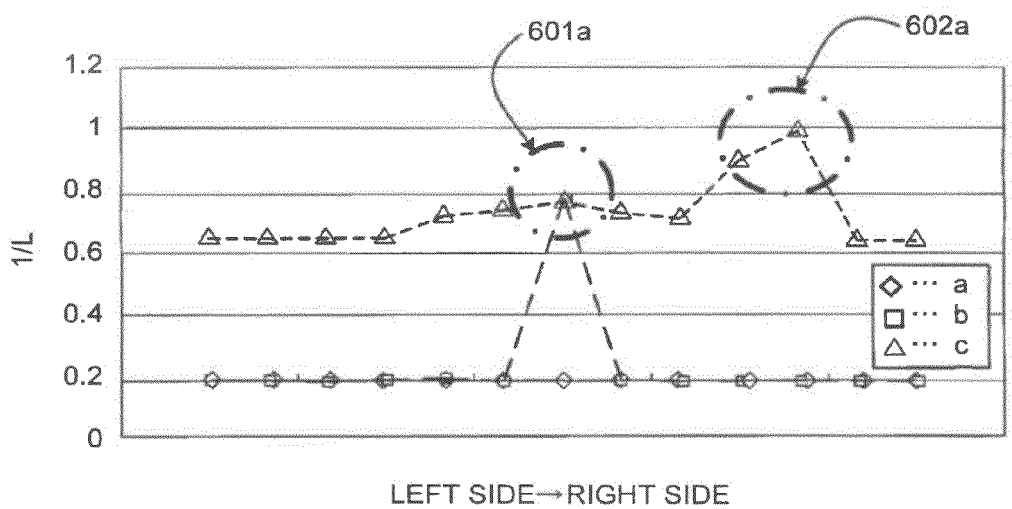
FIG. 49B is a graph illustrating another example of the distance distribution along horizontal lines in the range finding result obtained by the range finding method according to the related art.

FIG. 45 illustrates the outline of the system configuration of the digital camera illustrated in FIG. 44. The digital camera 100 includes an image capturing lens 102 having a plurality of lens groups, an aperture diaphragm unit 110 having a shutter function, a CCD image sensor 111 serving as a solid-state image capturing element on a light receiving surface of which an object image incident through the image capturing lens 102 is formed, a signal processing unit 112 that converts a pixel output signal (electric signal) output from the CCD image sensor 111 into digital image data that can be displayed or recorded, a control unit 114 that controls the overall operation of the digital camera 100 according to a control program stored in a ROM (not illustrated), on the basis of information on the operation input from an operation unit (for example, a release button 6 or an image capturing mode switching button 7 (see FIG. 1)) 113, a liquid crystal monitor (LCD) 115 that displays the image data generated by the signal processing unit 112, a focus lens driving unit 116 that drives a group of focus lenses in the image capturing lens 102, a zoom lens driving unit 117 that drives a group of zoom lenses in the image capturing lens 102, an aperture diaphragm driving unit 118 that drives the aperture diaphragm unit 110, and the range finding device, according to the embodiment, that measures the distance to the object. The image data generated by the signal processing unit 112 is recorded on a removable memory card 119 that is removable and attachable to the digital camera 100.

Next, a description is given of the range finding operation of the range finding device 1 when the digital camera 100 is used to capture the image of the object. When the user turns on a power supply (not illustrated) and sets the digital camera 100 in the image capturing mode, the control unit 114 outputs a command signal for starting a range finding operation to the range finding device 1. Then, object light incident on the pair of range finding lenses 12a and 12b is focused on each of the light receiving surfaces 16a and 16b. Then, the range finding process described in the first to third embodiments is performed to calculate the distance to a range-finding object and the calculated distance data is output to the control unit 114 through the external I/F block (183-4).

Then, the control unit 114 controls the driving of the focus lens driving unit 116 on the basis of the input distance information such that the group of the focus lenses of the image capturing lens 102 is moved to an in-focus position and an object image is formed on the light receiving surface of the CCD image sensor 111.

The signal processing unit 112 acquires pixel output signals output from each pixel of the CCD image sensor 111 and calculates the brightness of the object on the basis of the magnitudes of the pixel output signals. The calculated brightness information of the object is output to the control unit 114. The control unit 114 sets, for example, the opened state (aperture value) of the aperture diaphragm unit 110 and the number of times for actuating an electronic shutter of the CCD image sensor 111 on the basis of the input brightness information such that the amount of exposure appropriate for the object is obtained. The opened state of the aperture diaphragm unit 110 is controlled by the driving of the aperture diaphragm driving unit 118.

When the release button 6 is pressed, the image of the object is captured in an in-focus state and under an appropriate exposure condition (for example, the number of times for actuating the electronic shutter of the CCD image sensor 111 and the aperture value of the aperture diaphragm unit 110). Then, the signal processing unit 112 captures a pixel output signal, output from the CCD image sensor 111, and converts the pixel output signal into digital image data that can be displayed or recorded. The image data generated by the signal processing unit 112 is stored in the memory card 119 and is displayed as an image on the liquid crystal display (LCD) 115.

According to the embodiments, a distance can be measured with high accuracy even when there is a plurality of range-finding objects. In addition, according to the embodiments, the distance can be measured with high accuracy according to whether the range-finding object is indoors or outdoors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A range-finding device comprising:
    a plurality of image capturing elements that are provided at a predetermined interval;
    a lens that forms an image of a range-finding object on each of the image capturing elements;
    a distance calculating unit that calculates a distance to the range-finding object for each of a plurality of range-finding areas that are set on the respective image capturing elements based on an image signal output from each of the range-finding areas according to the image that is formed;
    a distribution generating unit that generates a distribution of the calculated distances; and
    a position specifying unit that specifies a position where the range-finding object is present in the range-finding area based on the distribution of the distances, wherein the position specifying unit calculates gradients of the distances of the respective range-finding areas in a column and a row in which the range-finding areas are arranged, and specifies a position of the range-finding object in the range-finding area based on the gradients of the distances, and wherein the range-finding device further comprises an indoor/outdoor determining unit that determines whether the range-finding object is one of indoors and outdoors based on the gradients in the column of the range-finding areas.

2. The range-finding device according to claim 1, wherein the position specifying unit specifies a range-finding area where a column and a row of the range-finding areas overlap each other as an area in which a range-finding object is not present when the gradient takes a constant value other than 0.

3. The range-finding device according to claim 1, wherein the position specifying unit specifies that the range-finding object is planar when the gradient takes a constant value equal to 0.

4. The range-finding device according to claim 1, wherein the indoor/outdoor determining unit determines that the range-finding object is outdoors when the distance calculated in the range-finding area that points to a direction opposite to gravitational direction in the column of the range-finding areas is one of infinity and being impracticable in the calculation.

5. The range-finding device according to claim 4, further comprising:
a leveling instrument that determines the gravitational direction.

6. An image capturing device comprising:
an image capturing element on which an image of an object is formed through an image capturing lens;
an image processing unit that generates image data based on a signal output from the image capturing element; and
a range-finding device that measures a distance to the object by using an optical system other than the image capturing lens,
wherein the range-finding device is the range-finding device according to claim 1.

* * * * *